(12) United States Patent
Feuersaenger et al.

(10) Patent No.: US 10,250,372 B2
(45) Date of Patent: *Apr. 2, 2019

(54) COMPONENT CARRIER (DE)ACTIVATION IN COMMUNICATION SYSTEMS USING CARRIER AGGREGATION

(71) Applicant: Sun Patent Trust, New York, NY (US)

(72) Inventors: Martin Feuersaenger, Bremen (DE); Joachim Loehr, Wiesbaden (DE); Alexander Golitschek Edler von Elbwart, Darmstadt (DE); Christian Wengerter, Kleinheubach (DE)

(73) Assignee: Sun Patent Trust, New York, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/276,465

(22) Filed: Sep. 26, 2016

(65) Prior Publication Data

US 2017/0012760 A1    Jan. 12, 2017

Related U.S. Application Data

(63) Continuation of application No. 14/598,093, filed on Jan. 15, 2015, now Pat. No. 9,497,763, which is a
(Continued)

(30) Foreign Application Priority Data

Feb. 12, 2010    (EP) .................................. 10001479
Apr. 1, 2010    (EP) .................................. 10003667

(51) Int. Cl.
*H04L 5/00*        (2006.01)
*H04W 72/04*    (2009.01)
(Continued)

(52) U.S. Cl.
CPC ............ *H04L 5/0098* (2013.01); *H04L 5/001* (2013.01); *H04L 5/0048* (2013.01);
(Continued)

(58) Field of Classification Search
CPC .... H04L 5/0096; H04L 5/0098; H04W 72/00; H04W 72/0453
See application file for complete search history.

(56) References Cited

U.S. PATENT DOCUMENTS 7,580,713 B2    8/2009    McBeath et al.
8,432,843 B2    4/2013    Cai et al.
(Continued)

FOREIGN PATENT DOCUMENTS

CN    101189903 A    5/2008
CN    101541029 A    9/2009
(Continued)

OTHER PUBLICATIONS

Alcatel-Lucent, Alcatel-Lucent Shanghai Bell, "Component carrier indication for bandwidth extension in LTE-A," R1-100411, 3GPP TSG-RAN WG1 #59bis, Agenda Item: 7.1.5, Valencia, Spain, Jan. 18-22, 2010, 5 pages.
(Continued)

*Primary Examiner* — Mansour Oveissi
(74) *Attorney, Agent, or Firm* — Seed IP Law Group LLP

(57) ABSTRACT

This invention relates to the proposal of component carrier (de)activation message that is allowing a activation or deactivation of one or more component carriers in the uplink or downlink. Furthermore, the invention relates to the use of the new component carrier (de)activation message in methods for (de)activation of downlink component carrier(s) configured for a mobile terminal, a base station and a mobile terminal. To enable efficient and robust (de)activation of component carriers, the invention proposes to use compo-
(Continued)

MAC control element (1 octet in size)

| DL SCC 1 activated/ deactivated | DL SCC 2 activated/ deactivated | DL SCC 3 activated/ deactivated | DL SCC 4 activated/ deactivated | SRS reporting for UL SCC linked to DL SCC 1 | SRS reporting for UL SCC linked to DL SCC 2 | SRS reporting for UL SCC linked to DL SCC 3 | SRS reporting for UL SCC linked to DL SCC 4 | bits used for downlink component carrier (de)activation (CC (de)activation bitmap)

bits used for SRS (de)activation on linked uplink component carriers (SRS (de)activation bitmap)

nent carrier-specific or cell-RNTI(s) for the scrambling of the CRC of the component carrier (de)activation message, and to explicitly indicate the intended recipient of the component carrier (de)activation message in a corresponding field in the message. Furthermore, the invention further proposes different designs of the component carrier (de) activation message and further uses thereof, so as to trigger CQI reporting and/or SRS transmission by a mobile terminal.

18 Claims, 18 Drawing Sheets

Related U.S. Application Data continuation of application No. 13/578,216, filed as application No. PCT/EP2011/000532 on Feb. 4, 2011, now Pat. No. 8,976,694.

(51) Int. Cl.

| | |
|---|---|
| *H04L 1/00* | (2006.01) |
| *H04L 25/03* | (2006.01) |
| *H04W 8/26* | (2009.01) |
| *H04W 28/04* | (2009.01) |
| *H04W 48/16* | (2009.01) |
| *H04W 72/00* | (2009.01) |

(52) U.S. Cl.
CPC .......... *H04L 5/0055* (2013.01); *H04L 5/0096* (2013.01); *H04W 72/0453* (2013.01); *H04L 1/0026* (2013.01); *H04L 1/0061* (2013.01); *H04L 5/0053* (2013.01); *H04L 25/03866* (2013.01); *H04W 8/26* (2013.01); *H04W 28/04* (2013.01); *H04W 48/16* (2013.01); *H04W 72/00* (2013.01)

(56) References Cited

U.S. PATENT DOCUMENTS

| | | | |
|---|---|---|---|
| 8,976,694 | B2 | 3/2015 | Feuersaenger et al. |
| 2002/0170013 | A1 | 11/2002 | Bolourchi et al. |
| 2009/0196175 | A1 | 8/2009 | Sammour et al. |
| 2010/0080187 | A1 | 4/2010 | Papasakellariou et al. |
| 2010/0103902 | A1* | 4/2010 | Kim .................... H04L 5/0048 370/330 |
| 2010/0118720 | A1 | 5/2010 | Gauvreau et al. |
| 2011/0159903 | A1 | 6/2011 | Yuk et al. |
| 2011/0170495 | A1 | 7/2011 | Earnshaw et al. |
| 2011/0269490 | A1 | 11/2011 | Earnshaw et al. |
| 2011/0292851 | A1 | 12/2011 | Fong et al. |
| 2011/0294491 | A1 | 12/2011 | Fong et al. |
| 2013/0039202 | A1 | 2/2013 | Feuersaenger et al. |
| 2015/0181604 | A1 | 6/2015 | Feuersaenger et al. |
| 2017/0150392 | A1* | 5/2017 | Dinan ............... H04W 28/0257 |

FOREIGN PATENT DOCUMENTS

| | | |
|---|---|---|
| CN | 101594683 A | 12/2009 |
| JP | 2012-530406 A | 11/2012 |
| JP | 2013-520053 A | 5/2013 |
| WO | 2009/120125 A1 | 10/2009 |
| WO | 2010/013970 A2 | 2/2010 |
| WO | 2010/025681 A1 | 3/2010 |
| WO | 2011/072721 A1 | 6/2011 |

OTHER PUBLICATIONS

Ericsson, ST-Ericsson, "Summary of the email discussion [68#23] LTE: CC activation / deactivation," Tdoc R2-100079, 3GPP TSG RAN WG2 #68bis, Agenda Item: 7.1.3, Valencia, Spain, Jan. 18-22, 2010, 17 pages.
English Translation of the Korean Notice of Preliminary Rejected, dated Jan. 11, 2017, for corresponding KR Application No. 2012-7021165, 12 pages.
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.212 V9.0.0, "3rd Generation Partnership Project; Technical Specification Group Radio Access Network; Evolved Universal Terrestrial Radio Access (E-UTRA); Multiplexing and channel coding (Release 9)," Dec. 2009, 61 pages.
3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.
Communication pursuant to Article 94(3) EPC, dated Sep. 19, 2014, for corresponding EP Application No. 11 702 404.2-1851, 7 pages.
English Translation of Notice of Reasons for Rejection, dated Apr. 5, 2016, for corresponding JP Application No. 2015-102861, 7 pages.
ETRI, "Explicit carrier activation/deactivation," R2-100148, Agenda Item: 7.1.3, 3GPP TSG RAN WG2 #68bis, Valencia, Spain, Jan. 18-22, 2010, 3 pages.
International Search Report dated Apr. 28, 2011, for corresponding International Application No. PCT/EP2011/000532, 6 pages.
Japanese Notice of Reasons for Rejection dated Aug. 26, 2014, for corresponding JP Application No. 2012-552300, 7 pages. (W/ English Translation).
NEC Group, "PDCCH Structure for LTE-Advanced System," R1-091692, Agenda Item: 15.4, TSG-RAN WG1#57, San Francisco, CA, US, May 4-8, 2009, 9 pages.
Research In Motion UK Limited, "Uplink Power Control for Carrier Aggregation," R1-093297, Agenda Item: 15.4, 3GPP TSG RAN WGI Meeting #58, Shenzhen, China, Aug. 24-28, 2009, 3 pages.
Sesia et al., "LTE—The UMTS Long Term Evolution: From Theory to Practice," John Wiley & Sons, Ltd., ISBN: 978-0-470-69716-0, 2009, Sections 6 and 9.
Chinese Office Action, dated Apr. 3, 2018, for Chinese Application No. 201610238184.4, 8 pages (English translation).

\* cited by examiner

COMPONENT CARRIER (DE)ACTIVATION IN COMMUNICATION SYSTEMS USING CARRIER AGGREGATION

FIELD OF THE INVENTION

This invention relates to the proposal of component carrier (de)activation message that is allowing an activation or deactivation of one or more component carriers in the uplink or downlink. Furthermore, the invention relates to the use of the new component carrier (de)activation message in methods for (de)activation of downlink component carrier (s) configured for a mobile terminal, a base station and a mobile terminal.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8).

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols are thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

Layer 1/Layer 2 (L1/L2) Control Signaling

In order to inform the scheduled users about their allocation status, transport format and other data related information (e.g. HARQ information, transmit power control (TPC) commands), L1/L2 control signaling is transmitted on the downlink along with the data. L1/L2 control signaling is multiplexed with the downlink data in a sub-frame, assuming that the user allocation can change from sub-frame to sub-frame. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI. The L1/L2 control signaling is transmitted on the Physical Downlink Control Channel (PDCCH). It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories.

Shared Control Information (SCI) carrying Cat 1 information

The shared control information part of the L1/L2 control signaling contains information related to the resource allocation (indication). The shared control information typically contains the following information:
- A user identity indicating the user(s) that is/are allocated the resources.
- RB allocation information for indicating the resources (Resource Blocks (RBs)) on which a user(s) is/are allocated. The number of allocated resource blocks can be dynamic.
- The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Down/ink Control Information (DCI) carrying Cat 2/3 information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:
- Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)
- Cat 3 information: HARQ related information, e.g. hybrid ARQ process number, redundancy version, retransmission sequence number Downlink control information occurs in several formats that differ in overall size and also in the information contained in its fields. The different DCI formats that are currently defined for LTE Release 8/9 (3GPP LTE) are described in detail in 3GPP TS 36.212, "Multiplexing and channel coding (Release 9)", version 8.8.0 or 9.0.0, section 5.3.3.1 (available at http://www.3gpp.org and incorporated herein by reference).

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:
- The physical resource(s) on which the data is transmitted (e.g. subcarriers or subcarrier blocks in case of OFDM, codes in case of CDMA). This information allows the UE (receiver) to identify the resources on which the data is transmitted.
- When user equipment is configured to have a Carrier Indication Field (CIF) in the L1/L2 control signaling this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e. the cross-scheduled component carrier does not carry any L1/L2 control signaling.
- The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.
- Hybrid ARQ (HARQ) information:
    - HARQ process number: Allows the user equipment to identify the hybrid ARQ process on which the data is mapped.
    - Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.

Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g. subcarriers or subcarrier blocks in case of OFDM, codes in case of CDMA).

When user equipment is configured to have a Carrier Indication Field (CIF) in the L1/L2 control signaling this information identifies the component carrier for which the specific control signaling information is intended. This enables assignments to be sent on one component carrier which are intended for another component carrier. This other, cross-scheduled component carrier may be for example a PDCCH-less component carrier, i.e. the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:

HARQ Process number: Tells the user equipment from which hybrid ARQ process it should pick the data.

Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.

Redundancy and/or constellation version: Tells the user equipment, which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipments to read this information.

There are several different flavors how to exactly transmit the information pieces mentioned above in uplink and downlink data transmission. Moreover, in uplink and downlink, the L1/L2 control information may also contain additional information or may omit some of the information. For example:

HARQ process number may not be needed, i.e. is not signaled, in case of a synchronous HARQ protocol.

A redundancy and/or constellation version may not be needed, and thus not signaled, if Chase Combining is used (always the same redundancy and/or constellation version) or if the sequence of redundancy and/or constellation versions is pre-defined.

Power control information may be additionally included in the control signaling.

MIMO related control information, such as e.g. precoding, may be additionally included in the control signaling.

In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RVO. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Physical Downlink Control Channel (PDCCH)

The physical downlink control channel (PDCCH) carries the L1/L2 control signaling, i.e. transmit power control commands and the scheduling grants for allocating resources for downlink or uplink data transmission. To be more precise, the downlink control channel information (i.e. the DCI contents, respectively, the L1/L2 control signaling information) is mapped to its corresponding physical channel, the PDCCH. This "mapping" includes the determination of a CRC attachment for the downlink control channel information, which is a CRC calculated on the downlink control channel information being masked with an RNTI, as will explained below in more detail. The downlink control channel information and its CRC attachment are then transmitted on the PDCCH (see 3GPP TS 36.212, sections 4.2 and 5.3.3).

Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE (Release 8/9), a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

Downlink control channel information in form of DCI transports downlink or uplink scheduling information, requests for aperiodic CQI reports, or uplink power control commands for one RNTI (Radio Network Terminal Identifier). The RNTI is a unique identifier commonly used in 3GPP systems like 3GPP LTE (Release 8/9) for destining data or information to a specific user equipment. The RNTI is implicitly included in the PDCCH by masking a CRC calculated on the DCI with the RNTI—the result of this operation is the CRC attachment mentioned above. On the user equipment side, if decoding of the payload size of data is successful, the user equipment detects the DCI to be destined to the user equipment by checking whether the CRC on the decoded payload data using the "unmasked" CRC (i.e. after removing the masking using the RNTI) is successful. The masking of the CRC code is for example performed by scrambling the CRC with the RNTI.

In 3GPP LTE (Release 8) the following different DCI formats are defined:

Uplink DCI formats:
  Format 0 used for transmission of UL SCH assignments
  Format 3 is used for transmission of TPC commands for PUCCH and PUSCH with 2 bit power adjustments (multiple UEs are addressed)
  Format 3A is used for transmission of TPC commands for PUCCH and PUSCH with single bit power adjustments (multiple UEs are addressed)
Downlink DCI formats:
  Format 1 used for transmission of DL SCH assignments for SIMO operation
  Format 1A used for compact transmission of DL SCH assignments for SIMO operation
  Format 1B used to support closed loop single rank transmission with possibly contiguous resource allocation
  Format 1C is for downlink transmission of paging, RACH response and dynamic BCCH scheduling
  Format 1D is used for compact scheduling of one PDSCH codeword with precoding and power offset information
  Format 2 is used for transmission of DL-SCH assignments for closed-loop MIMO operation
  Format 2A is used for transmission of DL-SCH assignments for open-loop MIMO operation For further information on the LTE physical channel structure in downlink and the PDSCH and PDCCH format, see Stefania Sesia et al., "LTE—The UMTS Long Term Evolution", Wiley & Sons Ltd., ISBN 978-0-47069716-0, April 2009, sections 6 and 9.

Blind Decoding of PDCCHs at the User Equipment

In 3GPP LTE (Release 8/9), the user equipment attempts to detect the DCI within the PDCCH using so-called "blind decoding" (sometimes also referred to as "blind detection"). This means that there is no associated control signaling that would indicate the CCE aggregation size or modulation and coding scheme for the PDCCHs signaled in the downlink, but the user equipment tests for all possible combinations of CCE aggregation sizes and modulation and coding schemes, and confirms that successful decoding of a PDCCH based on the RNTI. To further limit complexity a common and dedicated search space in the control signaling region of the LTE component carrier is defined in which the user equipment searches for PDCCHs.

In 3GPP LTE (Release 8/9) the PDCCH payload size is detected in one blind decoding attempt. The user equipment attempts to decode two different payload sizes for any configured transmission mode, as highlighted in Table 1 below. Table 1 shows that payload size X of DCI formats 0, 1A, 3, and 3A is identical irrespective of the transmission mode configuration. The payload size of the other DCI format depends on the transmission mode.

TABLE 1

DCI Formats

| payload size X | payload size different from X | transmission mode | |
|---|---|---|---|
| 0/1A/3/3A | 1C | | broadcast/unicast/paging/power control |
| | 1 | Mode 1 | DL TX modes |
| | 1 | Mode 2 | |
| | 2A | Mode 3 | |
| | 2 | Mode 4 | |
| | 1B | Mode 5 | |
| | 1D | Mode 6 | |
| | 1 | Mode 7 | |
| | 1 | Mode 1 | SPS-Modes |
| | 1 | Mode 2 | |
| | 2A | Mode 3 | |
| | 2 | Mode 4 | |
| | 1 | Mode 7 | |

Accordingly, the user equipment can check in a first blind decoding attempt the payload size of the DCI. Furthermore, the user equipment is further configured to only search for a given subset of the DCI formats in order to avoid too high processing demands.

Medium Access Layer (MAC)

The MAC layer is one of the sub-layers of the Layer 2 in the 3GPP LTE radio protocol stack. The MAC layer performs (de)multiplexing between logical channels and transport channels by (de)constructing MAC PDUs (Protocol Data Units), also known as transport blocks. MAC PDUs are constructed out of MAC SDUs (Service Data Units) received through one or more logical channels in the transmitter. On the receiver side the MAC PDUs are reconstructed out of the received MAC PDUs.

The transport block (MAC PDU) consists of a header and a payload. Apart from MAC SDUs the payload can consist of MAC Control Elements and padding.

MAC Control Elements

For peer to peer signaling on MAC level MAC Control Elements (CEs) are used. MAC Control Elements can be part of a MAC PDU's payload as described above and are identified by a specific Logical Channel ID (LCID) in the MAC header.

There are several types of MAC CEs. Some of them are only included in uplink transport blocks for signaling from user equipment to eNodeB, others only in downlink transport blocks for signaling from eNodeB to user equipment. The special LCIDs and the corresponding MAC Control Elements transmitted on the downlink are listed in Table 2.

TABLE 2

| LCID value | MAC Control Element used for |
| --- | --- |
| 11100 | UE Contention Resolution Identity |
| 11101 | Timing Advance Command |
| 11110 | DRX Command |

The special LCIDs and the corresponding MAC Control Elements transmitted on the uplink are listed in Table 3.

TABLE 3

| LCID value | MAC Control Element used for |
| --- | --- |
| 11010 | Power Headroom Report |
| 11011 | C-RNTI |
| 11100 | Truncated Buffer Status Report (BSR) |
| 11101 | Short BSR |
| 11110 | Long BSR |

Sounding Reference Signals (SRS)

Sounding reference signals are send in the uplink. Together with the Demodulation Reference Signals (DM RS) they are included in the uplink to enable channel estimation for coherent demodulation as well as channel quality estimation for uplink scheduling.

While DM RSs are associated with the transmission of uplink data, the SRSs are not associated with data transmission and primarily used for channel quality estimation to enable frequency-selective scheduling by the scheduling eNodeB. Furthermore SRSs can be used to enhance power control or to support the eNodeB in deciding on initial Modulation and Coding Scheme (MCS) for data transmission. If configured by higher layer signaling, the SRSs are transmitted in the last SC-FDMA symbol in a uplink subframe. The sub-frame in which SRSs are to be transmitted by the user equipment is indicated by cell-specific broadcast signaling and is selected out of a set of 15 possible subframes within a radio frame. Data transmission on the Physical Uplink Shared CHannel (PUSCH) is not allowed in the sub-frame designated for transmitting SRSs, which sets the SRS overhead to 7% when all possible sub-frames are configured for SRS transmission. As mentioned above, SRS configuration is done by the eNodeB using higher layer signaling. The configuration inter alia determines amongst other parameters duration and periodicity of the SRSs.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

In Carrier Aggregation (CA), two or more Component Carriers (CCs) are aggregated in order to support wider transmission bandwidths up to 100 MHz. All component carriers can be configured to be 3GPP LTE (Release 8/9) compatible, at least when the aggregated numbers of component carriers in the uplink and the downlink are the same. This does not necessarily mean that all component carriers need to be compatible to 3GPP LTE (Release 8/9).

A user equipment may simultaneously receive or transmit on one or multiple component carriers. On how many component carriers simultaneous reception/transmission is possible, is depending on the capabilities of a user equipment.

A 3GPP LTE (Release 8/9) compatible user equipment can receive and transmit on a single CC only, provided that the structure of the CC follows the 3GPP LTE (Release 8/9) specifications, while a 3GPP LTE-A (Release 10) compatible user equipment with reception and/or transmission capabilities for carrier aggregation can simultaneously receive and/or transmit on multiple component carriers.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the user equipment only has one Radio Resource Control (RRC) connection with the network. One cell—the "special cell"—provides the security input and the Non-Access Stratum (NAS) mobility information (e.g. TAI). There is only one special cell per user equipment in connected mode.

After RRC connection establishment to the special cell, the reconfiguration, addition and removal of component carriers can be performed by RRC. At intra-LTE handover, RRC can also add, remove, or reconfigure component carriers for usage in the target cell.

When adding a new component carrier, dedicated RRC signaling is used for sending component carriers' system information which is necessary for component carrier transmission/reception, similar to a handover in 3GPP LTE (Release 8/9).

When a user equipment is configured with carrier aggregation there is one pair of uplink and downlink component carriers that is always activate. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats.

A linking between uplink and downlink component carriers allows identifying the uplink component carrier for which the grant applies when there is no-cross-carrier scheduling.

The linkage of downlink component carriers to uplink component carriers does not necessarily need to be one to one. In other words, more than one downlink component carrier can link to the same uplink component carrier. At the same time, a downlink component carrier can only link to one uplink component carrier. FIG. 7 and FIG. 8 exemplarily show possible linkages between downlink and uplink component carriers. While in FIG. 7 all downlink component carriers are linked to the same uplink component carrier, in FIG. 8 downlink component carriers 1 and 2 are linked to uplink component carrier 1 and downlink component carrier 3 is linked to uplink component carrier 2.

DRX and Carrier Aggregation

In order to provide reasonable battery consumption of user equipment 3GPP LTE (Release 8/9) as well as 3GPP LTE-A (Release 10) provides a concept of discontinuous reception (DRX).

For this concept the following terms describe the user equipment's state in terms of DRX.

on-duration: duration in downlink sub-frames that the user equipment waits for, after waking up from DRX, to receive PDCCHs. If the user equipment successfully decodes a PDCCH, the user equipment stays awake and starts the inactivity timer;

inactivity-timer: duration in downlink sub-frames that the user equipment waits to successfully decode a PDCCH, from the last successful decoding of a PDCCH, failing which it re-enters DRX. The user equipment shall restart the inactivity timer following a single successful decoding of a PDCCH for a first transmission only (i.e. not for retransmissions).

active-time: total duration that the user equipment is awake. This includes the "on-duration" of the DRX cycle, the time user equipment is performing continuous reception while the inactivity timer has not expired and the time user equipment is performing continuous reception while waiting for a downlink retransmission after one HARQ RTT (Round Trip Time). Based on the above the minimum active time is of length equal to on-duration, and the maximum is undefined (infinite);

There is only one DRX cycle per user equipment. All aggregated component carriers follow this DRX pattern.

In order to allow for further battery saving optimization, a further step of activation/deactivation of component carriers is introduced. Essentially a downlink component carrier could be in one of the following three states: non-configured, configured but deactivated and active. When a downlink component carrier is configured but deactivated, the user equipment does not need to receive the corresponding PDCCH or PDSCH, nor is it required to perform CQI measurements. Conversely, when a downlink component carrier is active, the user equipment shall receive PDSCH and PDCCH (if present), and is expected to be able to perform CQI measurements. After configuration of component carriers in order to have PDCCH and PDSCH reception on a downlink component as described above, the downlink component carrier needs to be transitioned from configured but deactivated to active state.

In the uplink however, a user equipment is always required to be able to transmit on PUSCH on any configured uplink component carrier when scheduled on the corresponding PDCCH (i.e. there is no explicit activation of uplink component carriers).

For user equipment power-saving purposes, it's crucial that additional component carriers can be de-activated and activated in an efficient and fast way. With bursty data-transmission, it is imperative that additional component carriers can be activated and de-activated quickly, such that both the gains of high bit-rates can be utilized, and battery preservation can be supported. As described before user equipments will not perform and report CQI measurements on configured but deactivated downlink component carriers but only radio resource management related measurements like RSRP (Reference Signal Received Power) and RSRQ (Reference Signal Received Quality) measurements. Hence when activating a downlink component carrier, it's important that eNodeB acquires quickly CQI information for the newly activated component carrier(s) in order to being able to select an appropriate MCS for efficient downlink scheduling. Without CQI information eNodeB doesn't have knowledge about user equipment's downlink channel state and might only select a rather conservative MCS for downlink data transmission which would in turn lead to some resource utilization inefficiency.

In order to acquire CQI information quickly, eNodeB can schedule an aperiodic CQI by means of an uplink scheduling grant. The aperiodic CQI would be transmitted on the physical uplink shared channel (PUSCH). Therefore in order to activate a configured downlink component carrier, eNodeB would need to issue essentially two grants (PDCCH) to the UE, one downlink PDCCH in order to indicate the activation of a downlink component carrier and one uplink PDCCH which schedules uplink resources for the transmission of the aperiodic CQI. Furthermore both PDCCH has to be sent respectively received in the same TTI in order to ensure, that user equipment measures and reports CQI information for the correct downlink component carrier, i.e. the downlink component carrier which will be activated.

The correct reception of the aperiodic CQI can serve as an acknowledgement for the downlink activation command, i.e. when aperiodic CQI has been received eNodeB assumes that user equipment has activated the downlink component carrier indicated in the downlink PDCCH.

As it becomes apparent, the main drawback of the above described component carrier activation method is, that two PDCCHs are required in order to activate a downlink component carrier. Furthermore due to the fact that the two PDCCHs need to be received/sent simultaneously, certain error cases may occur in the presence of PDCCH loss.

In case only the downlink "activation" PDCCH is lost, user equipment will not activate the downlink component carrier. However based on received CQI information eNB erroneously assumes downlink activation has succeeded.

In the second error case when only the uplink PDCCH which requests the aperiodic CQI is lost, eNodeB doesn't acquire CQI and erroneously assumes that downlink activation has failed.

SUMMARY OF THE INVENTION

One object of the invention is to overcome at least one of the described problems. Furthermore, it is another object of the invention to enable efficient and robust (de)activation of component carriers.

The object is solved by the subject matter of the independent claims. Advantageous embodiments of the invention are subject to the dependent claims.

A first aspect of the invention is the provision of a signaling format for communicating a component carrier (de)activation message for controlling the activation state of at least one component carrier. The proposed format comprises an identifier of the intended recipient of the component carrier (de)activation message, e.g. by including a mobile terminal identifier (ID). This mobile terminal ID (also referred to as a UE ID) may be for example explicitly signaled in a field of the component carrier (de)activation message. In view of the component carrier (de)activation message indicating the intended recipient for the component carrier (de)activation message, a CRC that is calculated based on the component carrier (de)activation message can be scrambled with a component carrier-specific or cell-specific radio network temporary identifier. As will be outlined below in further detail, this has the advantage that not as many radio network temporary identifiers (the total number of which is limited by the number of bits spent for the radio network temporary identifier) in comparison to a solution, where a radio network temporary identifier for component carrier (de)activation is assigned to the mobile terminals on a per-mobile terminal basis.

Furthermore, the component carrier (de)activation message format may be considered a new format of downlink control channel information that is mapped to the physical downlink control channel (PDCCH). The use of the component carrier-specific or cell-specific radio network temporary identifiers therefore indicate the format of the downlink control channel information being a component carrier (de)activation message. Furthermore, in case of using component carrier-specific radio network temporary identifier(s) that is/are linked to a respective component carrier, carrier-specific radio network temporary identifier(s) also indicate(s) a component carrier to be activated or deactivated. Hence, the component carrier (de)activation message as well as the CRC attachment (i.e. the CRC for the component carrier (de)activation message scrambled with a given radio network temporary identifier) indicate to the mobile terminal the activation state of the component carriers, i.e. indicate which of them is/are to be (de)activated.

Another, second of the invention is to propose a mechanism for (de)activating downlink component carriers configured by a mobile terminal by means of a component carrier (de)activation message that is transmitted on a physical downlink shared channel as part of a transport block. According to this aspect of the invention, the component carrier (de)activation message comprises (de)activation information that indicates for the respective downlink component carriers configured by the mobile terminal, the activation state of the respective component carriers. This way, the mobile terminal can recognize a change in the activation state of the respective downlink component carriers and may activate or deactivate them accordingly. In one exemplary implementation, the (de)activation information for the component carriers may be provided in a MAC control element, i.e. by means of MAC signaling.

Furthermore, still in line with this second aspect of the invention, the (de)activation information may be provided in form of a bitmap, the individual bits of which indicate the activation state of a respective configured downlink component carrier associated to a respective bit of the bitmap.

It should be noted that—in line with the first and second aspect of the invention—in cases where there is a downlink component carrier configured for the mobile terminal that is always active, the (de)activation information does not need to indicate the activation state for such "always active" component carrier—the "always active" downlink component carrier is also referred to as the downlink primary component carrier (PCC) herein.

A further aspect of the invention is to trigger the signaling of sounding reference signals (SRSs) in the uplink. For this purpose, a SRS (de)activation message is defined which is reusing the different structures and mechanisms for transmitting the component carrier (de)activation message according to the various embodiments described herein. For example, the SRS (de)activation message may also comprise SRS (de)activation information that indicated the activation state of the SRS transmission for the uplink component carriers configured for the mobile terminal. This SRS (de)activation information may be provided in form of a bitmap, the individual bits of which indicate the activation state SRS signaling on the respective configured uplink component carrier associated to a respective bit of the bitmap. Please note that alternatively the bits of the bitmap in the SRS (de)activation message may also be considered associated to respective configured downlink component carriers, and the logical values of the individual bits of the bitmap indicate the activation state of SRS signaling on the uplink component carrier linked to the respective downlink component carrier associated to the given bit in the bitmap. The SRS (de)activation message may be signaled as part of a transport block on the physical uplink shared channel or may be signaled as a new format of downlink control channel information that is mapped to the physical downlink control channel (PDCCH) as described herein in line with the first aspect of the invention.

Moreover, the SRS (de)activation information may also be sent together with (de)activation information for activating/deactivating configured downlink component carriers within a single message. For example, the SRS (de)activation information and the component carrier (de)activation information may be signaled in a single MAC control element as part of a transport block of the physical downlink shared channel, or may be signaled together in a new format of downlink control channel information that is mapped to the physical downlink control channel (PDCCH) as described herein in line with the first aspect of the invention.

According to one exemplary embodiment of the invention, a method for (de)activating configured component carriers in communication system using component carrier aggregation is provided. According to this method a mobile terminal receives on a physical downlink shared channel a transport block comprising a component carrier (de)activation message. Component carrier (de)activation message comprises (de)activation information in form of a bitmap consisting of a number of bits. Each of the bits of the bitmap is associated to a respective one of the configured downlink component carriers, wherein logical value of each bit is indicating whether the associated downlink component carrier is to be activated or deactivated. Furthermore, the mobile terminal activates or deactivates the configured component carriers according to (de)activation information obtained from the component carrier (de)activation message.

In one exemplary implementation according to another embodiment of the invention, the component carrier (de)activation message is a MAC control element.

Optionally, the component carrier (de)activation message may be multiplexed to the transport block together with other logical channel data to be transmitted to the mobile terminal.

In another embodiment of the invention, one of the plurality of configured downlink component carriers is a downlink primary component carrier. This which primary component carrier cannot be activated or deactivated by the component carrier (de)activation message. Accordingly, the (de)activation information of the component carrier (de)activation message do not need to comprise an indication of the activation state of the primary component carrier of the mobile terminal.

In one exemplary implementation, the base station may ensure that the transport block comprising a component carrier (de)activation message is received by the mobile terminal on the downlink primary component carrier of the mobile terminal.

Optionally, the component carrier (de)activation message may further comprise SRS information allowing the base station to request the mobile terminal to start sending a sounding reference signal (SRS) on at least one of the uplink component carriers respectively linked to the configured downlink component carriers. In a more detailed implementation, the SRS information is provided in form of a bitmap consisting of a number of bits. Each of the bits of the bitmap within the SRS information is associated to a respective one of uplink component carriers and the logical value of each bit of the bitmap is indicating whether SRS should be transmitted on the associated uplink component carrier by the mobile terminal.

Another embodiment of the invention is providing a method for (de)activating configured component carriers in communication system using component carrier aggregation. According to this method the mobile terminal receives a sub-frame from a base station, and performs a blind decoding within a control signaling region on one of the configured downlink component carriers within the received sub-frame to obtain a component carrier (de)activation message and a CRC attachment thereof. The component carrier (de)activation message and its CRC attachment may be considered a PDCCH. The CRC attachment comprises a CRC of the component carrier (de)activation message, wherein the CRC is scrambled with a component carrier-specific or cell-specific radio network temporary identifier (RNTI) used for signaling the activation state of the target component carrier(s).

The mobile terminal checks the CRC of the CRC attachment using the component carrier-specific or radio cell-specific radio network temporary identifier. This may be for example realized by the mobile terminal descrambling the CRC with the component carrier-specific or radio cell-specific radio network temporary identifier, and subsequently comparing the resultant descrambled CRC with the locally generated CRC from the received and decoded downlink control channel information (without CRC).

In case of a match, i.e. if the CRC check passes, the mobile terminal determines a mobile terminal identifier (e.g. a UE ID or a mobile terminal-specific RNTI) from the component carrier (de)activation message. Based on the mobile terminal identifier the mobile terminal verifies whether the component carrier (de)activation message is destined to the mobile terminal. If the component carrier (de)activation message is destined to the mobile terminal, the mobile terminal activates or deactivates the configured component carriers according to (de)activation information obtained from the component carrier (de)activation message and/or implicit to the use of the radio network temporary identifier for scrambling the CRC attachment.

Furthermore, according to another embodiment of the invention, another method for (de)activating configured component carriers in communication system using component carrier aggregation is employed. According to this method the base station transmits a sub-frame to the mobile terminal. The sub-frame comprises within a control signaling region on one of the configured downlink component carriers a component carrier (de)activation message and a CRC attachment thereof (i.e. a PDCCH). The component carrier (de)activation message indicates at least a mobile terminal identifier to address the message to its intended receiver (mobile terminal). The CRC attachment comprises a CRC of the component carrier (de)activation message that has been calculated on the component carrier (de)activation message by a processor of the base station and has been subsequently scrambled with a component carrier-specific or cell-specific radio network temporary identifier (RNTI) used for signaling the activation state of the target component carrier(s).

In a further embodiment of the invention, the component carrier (de)activation message indicates which of the plurality of configured downlink component carriers is/are to be activated, respectively deactivated. Hence, in this embodiment of the invention the indication of the configured component carrier to be (de)activated may be comprised in a carrier indication field of the component carrier (de)activation message.

Furthermore, in another exemplary embodiment, the state of the indicated component carrier is implicit to the RNTI used for scrambling the CRC. In this embodiment, there may be two radio cell-specific radio network temporary identifiers used for signaling the activation state of the downlink component carriers. One of the radio network temporary identifiers is indicating the activation of at least one of the configured downlink component carriers indicated in the component carrier (de)activation message and the other radio network temporary identifier is indicating the deactivation of at least one of the configured downlink component carriers indicated in the component carrier (de)activation message.

In an alternative implementation according to another embodiment of the invention, the component carrier to be (de)activated is implicit to the RNTI used for scrambling the CRC. In this embodiment, it can be assumed that each configured downlink component carrier is linked to a component carrier-specific radio network temporary identifier. The component carrier-specific radio network temporary identifier used for scrambling the CRC thus implicitly indicates at least the configured downlink component carrier to be activated or deactivated.

In a variation of this embodiment, the component carrier (de)activation message indicates whether the configured downlink component carrier to be activated or deactivated linked to the component carrier-specific radio network temporary identifier used for scrambling the CRC is to be activated or deactivated.

In a further variation of this embodiment, each configured downlink component carrier may be linked to two component carrier-specific radio network temporary identifiers, and the component carrier-specific radio network temporary identifier used for scrambling the CRC indicates at least the configured downlink component carrier and whether it is to be activated or deactivated. Hence, in this variation the indication of the component carrier and its activation state are implicit to the RNTI used for scrambling the CRC.

In another embodiment of the invention, the component carrier (de)activation message comprises an activation flag that requests the mobile terminal to activate, respectively deactivate an indicated configured downlink component carrier.

In one further exemplary embodiment, the component carrier (de)activation message received within the control signaling region of a sub-frame is received on a downlink primary component carrier of the mobile terminal.

In another embodiment of the invention, the activation of a downlink component carrier triggers the transmission of a power headroom report by the mobile terminal for the uplink component carrier linked to the downlink component carrier being activated. For example the mobile terminal may transmit, in response to the activation of a downlink component carrier, a power headroom report for the for the uplink component carrier linked to the downlink component carrier being activated. The power headroom report is transmitted by the mobile terminal on the linked uplink component carrier on resources assigned on the linked uplink component carrier assigned to the mobile terminal by the next uplink resource assignment for the linked uplink component carrier.

In a further embodiment of the invention, the mobile terminal deactivates the indicated component carrier in case the component carrier (de)activation message indicates the deactivation of a downlink component carrier. This deactivation is however not performed immediately, but upon a HARQ protocol used for transmitting transport blocks is acknowledging successful decoding of a transport block pending for transmission on the downlink component carrier to be deactivated at the time of receiving the component carrier (de)activation message, or upon reaching a maximum number of retransmissions of the HARQ protocol for the transport block pending for transmission on the downlink component carrier to be deactivated.

In this context the transport block pending for transmission is referring to one or more transport blocks transmitted in individual HARQ processes on the downlink component carrier to be deactivated and that are currently transmitted (retransmission of the transport block is pending) at the time of receiving the deactivation command for the downlink component carrier.

In addition thereto, or alternatively, according to another embodiment of the invention, the component carrier (de)activation message comprises a SRS flag that, when set, requests the mobile terminal to start sending a sounding reference signal (SRS) on the uplink component carrier linked to the indicated configured downlink component carrier.

Optionally, the SRS flag, when not set, may request the mobile terminal to stop sending a sounding reference signal (SRS) on the uplink component carrier linked to the indicated configured downlink component carrier.

In addition to at least one of the activation flag and the SRS flag, or alternatively thereto, the component carrier (de)activation message according to a further embodiment of the invention comprises a CQI request flag that, when set, requests channel quality feedback for the one or more indicated configured downlink component carriers.

In a variation of this embodiment, in case the mobile terminal is requested to send channel quality feedback for an indicated downlink component carrier, the mobile terminal performs a channel quality measurement for each downlink component carrier indicated by the component carrier (de)activation message, and transmits the channel quality feedback for the one or more indicated downlink component carriers to the base station.

The channel quality feedback may be for example transmitted on pre-configured uplink resources on a physical uplink shared channel (PUSCH) or a physical uplink control channel (PUCCH), or alternatively on uplink resources on the physical uplink control channel (PUCCH) configured by RRC for periodic channel quality feedback.

In one exemplary implementation the channel quality feedback is transmitted 4 sub-frames or 4 ms after having received the sub-frame comprising the component carrier (de)activation message.

In the examples given above, the channel quality feedback may be an aperiodic channel quality feedback. In addition or as an alternative to triggering such aperiodic channel quality feedback or alternatively thereto, the CQI flag may be used to trigger the mobile terminal to start sending periodic channel quality feedback. Accordingly, in case the mobile terminal is requested to send channel quality feedback for an indicated downlink component carrier the mobile terminal may periodically perform a channel quality measurement for each downlink component carrier indicated by the component carrier (de)activation message, and may periodically transmit the channel quality feedback for the one or more indicated downlink component carriers to the base station on uplink resources for example on the physical uplink control channel configured by RRC for periodic channel quality feedback.

Furthermore, in order not to increase the blind decoding attempts of the mobile terminal to detect the format of the control channel information signaled on the PDCCH of the received sub-frame, in another embodiment of the invention, the component carrier (de)activation message format (which can be considered a DCI format) has the same size (number of bits) as at least one other downlink control information format defined in the mobile communication system. For example, when implementing the invention in a 3GPP LTE-A (Release 10) system or its successors, the component carrier (de)activation message format may have the same size as DCI formats 0/1A in 3GPP LTE (Release 8/9) or 3GPP LTE-A (Release 10). Moreover, the size of the component carrier (de)activation message format may optionally depend on the component carrier bandwidth. The component carrier bandwidth may be for example the bandwidth of the component carrier the activation state of which is signaled by the component carrier (de)activation message and/or its CRC attachment, or the bandwidth of the component carrier on which the component carrier (de)activation message is signaled.

In another embodiment of the invention, the reception of the component carrier (de)activation message is acknowledged by the mobile terminal. This may be for example realized by signaling an ACK/NACK in the uplink at a given timing relative to the transmission of the component carrier (de)activation message. Alternatively, the acknowledgment may also be sent in form of channel quality feedback on the indicated downlink component carrier(s). This latter option may for example be useful, if a CQI flag in the component carrier (de)activation message is triggering channel quality feedback from the mobile terminal.

A further aspect of the invention is the implementation of the different methods for (de)activating configured component carriers in communication system using component carrier aggregation in hardware and/or software. In this respect, different apparatuses that perform or participate in the performance of such methods are provided.

One embodiment of the invention thus provides a mobile terminal for (de)activating configured component carriers in communication system using component carrier aggregation. The mobile terminal comprises a receiver for receiving on a physical downlink shared channel a transport block comprising a component carrier (de)activation message, wherein the component carrier (de)activation message comprises (de)activation information indicating which of a plurality of configured downlink component carriers is/are to be activated, respectively deactivated by the mobile terminal, and a processor for activating or deactivating the configured component carriers according to (de)activation information obtained from the component carrier (de)activation message.

Furthermore, according to an embodiment of the invention, the mobile terminal is adapted to/comprises means to perform the method for (de)activating configured component carriers in communication system using component carrier aggregation according to one of the various embodiments described herein, where the component carrier (de)activation message is sent as part of a transport block on the physical downlink shared channel.

Another embodiment of the invention provides a mobile terminal for use in a communication system using component carrier aggregation. The mobile terminal comprises a receiver for receiving a sub-frame from a base station, and a processing means for performing a blind decoding within a control signaling region on one of the configured downlink component carriers within the received sub-frame to obtain a component carrier (de)activation message and a CRC attachment thereof, wherein the CRC attachment comprises a CRC of the component carrier (de)activation message, the CRC being scrambled with a component carrier-specific or cell-specific radio network temporary identifier (RNTI) used for signaling the activation state of the target component carrier(s). The blind decoding may for example also involve the operations of a decoder and a demodulator of the mobile terminal.

The mobile terminal's processor further checks the CRC of the CRC attachment using the component carrier-specific or radio cell-specific radio network temporary identifier. As mentioned above, this check of the CRC may be for example implemented by descrambling the CRC of the CRC attachment using the component carrier-specific or radio cell-specific radio network temporary identifier, and subsequently comparing the descrambled CRC with the a CRC (locally) generated by the processor of the mobile terminal from the received and decoded downlink control channel.

In case of a match, i.e. in case the CRC check passes, the mobile terminal determines a mobile terminal identifier from the component carrier (de)activation message. Furthermore, the processor verifies based on the mobile terminal identifier whether the component carrier (de)activation message is destined to the mobile terminal.

Accordingly, the mobile terminal can activate or deactivate the configured component carriers according to (de)activation information obtained from the component carrier (de)activation message and/or implicit to the use of the radio network temporary identifier for scrambling the CRC attachment, if the component carrier (de)activation message is destined to the mobile terminal.

In another embodiment of the invention, a base station for (de)activating configured component carriers of a mobile terminal in communication system using component carrier aggregation is provided. The base station comprises a processor for generating a component carrier (de)activation message comprising at least a mobile terminal identifier of the mobile terminal. The processor further determines a CRC for the component carrier (de)activation message, and scrambles the CRC with a component carrier-specific or cell-specific radio network temporary identifier (RNTI) used for signaling the activation state of the target component carrier(s), to thereby obtain a CRC attachment of the component carrier (de)activation message. Moreover, the base station also includes a transmitter for transmitting the component carrier (de)activation message and its CRC attachment within the control signaling region of a downlink component carrier within a sub-frame to the mobile terminal.

The invention further relates the implementation of the methods for (de)activating configured component carriers in communication system using component carrier aggregation described herein in software. One further embodiment of the invention is therefore providing a computer-readable medium storing instructions that, when executed by a processor of a mobile terminal, cause the mobile terminal to (de)activate configured component carriers in communication system using component carrier aggregation, by receiving on a physical downlink shared channel a transport block comprising a component carrier (de)activation message, wherein the component carrier (de)activation message comprises (de)activation information indicating which of a plurality of configured downlink component carriers is/are to be activated, respectively deactivated by the mobile terminal, and activating or deactivating the configured component carriers according to (de)activation information obtained from the component carrier (de)activation message.

A further embodiment of the invention relates to a computer-readable medium that is storing instructions that, when executed by a processor of a mobile terminal, cause the mobile terminal to perform one of the different methods for (de)activating configured component carriers in communication system using component carrier aggregation. In one example, the mobile terminal may be for example caused to receive a sub-frame from a base station, and to perform a blind decoding within a control signaling region on one of the configured downlink component carriers within the received sub-frame to obtain a component carrier (de)activation message and a CRC attachment thereof. The CRC attachment comprises a CRC of the component carrier (de)activation message, wherein the CRC is scrambled with a component carrier-specific or cell-specific radio network temporary identifier (RNTI) used for signaling the activation state of the target component carrier(s).

The mobile terminal may be further caused by the executed instructions to check the CRC of the CRC attachment using the component carrier-specific or radio cell-specific radio network temporary identifier. In case the CRC check passes, the mobile terminal is caused to determine a mobile terminal identifier (e.g. a UE ID or a mobile terminal-specific RNTI) from the component carrier (de)activation message. Moreover, the instructions, when executed by the mobile terminal's processor, cause the mobile terminal to verify based on the mobile terminal identifier whether the component carrier (de)activation message is destined to the mobile terminal, and If the component carrier (de)activation message is destined to the mobile terminal, to activate or deactivates the configured component carriers according to (de)activation information obtained from the component carrier (de)activation message and/or implicit to the use of the radio network temporary identifier for scrambling the CRC attachment.

Another embodiment therefore relates to a computer-readable medium that is storing instructions that, when executed by a processor of a base station, cause the base station to perform one of the different methods for (de)activating configured component carriers in communication system using component carrier aggregation. In one example, the base station may be for example caused to generate a component carrier (de)activation message comprising at least a mobile terminal identifier of the mobile terminal. The execution of the instructions by the processor of the base station may further cause the base station to determine a CRC for the component carrier (de)activation message, and to scramble the CRC with a component carrier-specific or cell-specific radio network temporary identifier (RNTI) used for signaling the activation state of the target component carrier(s), for thereby obtaining a CRC attachment of the component carrier (de)activation message. Moreover, the base station is also caused by the execution of the instructions by its processor to transmit the component carrier (de)activation message and its CRC attachment within the control signaling region of a downlink component carrier within a sub-frame to the mobile terminal.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
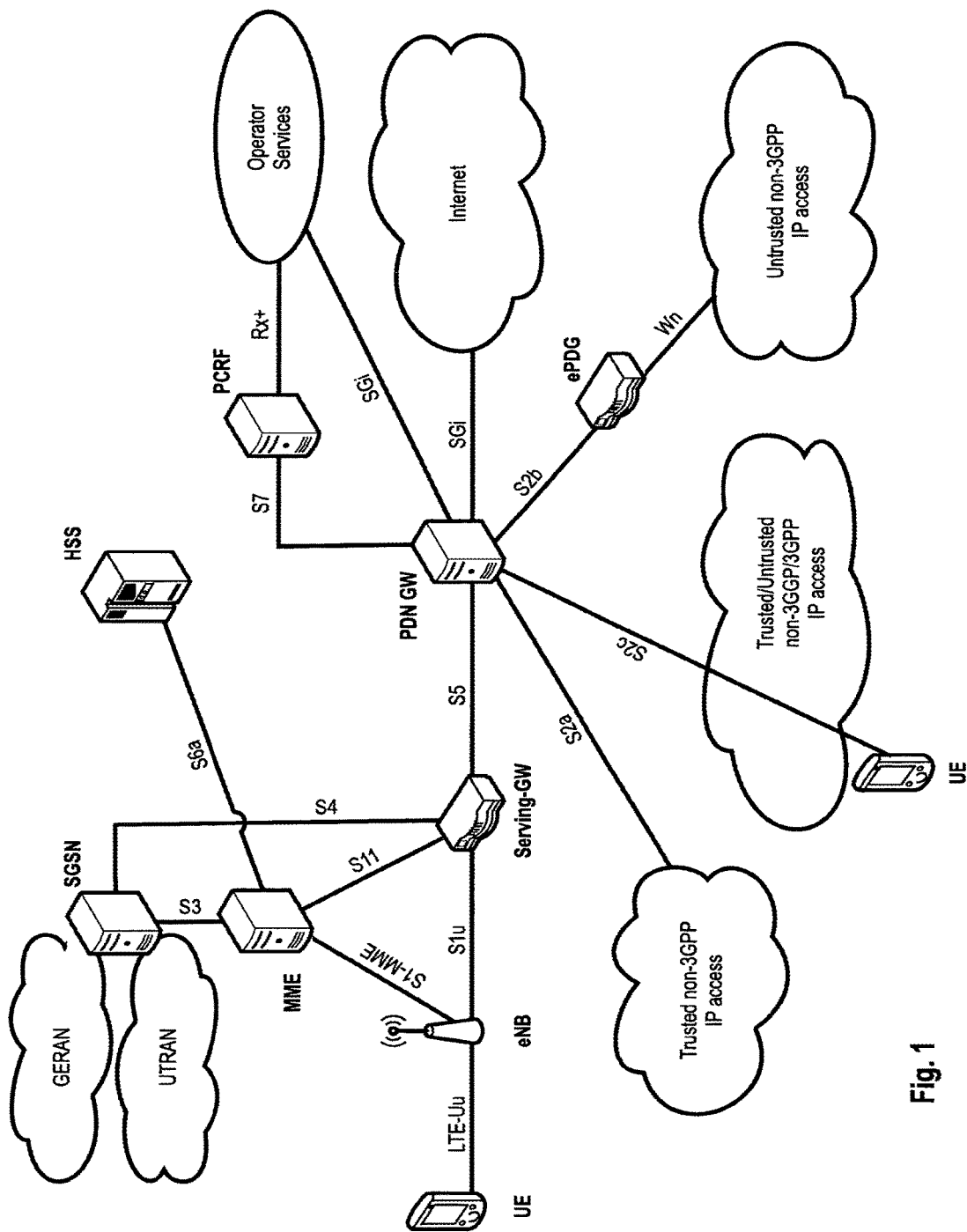
FIG. 1 shows an exemplary architecture of a 3GPP LTE system.
Figure 2:
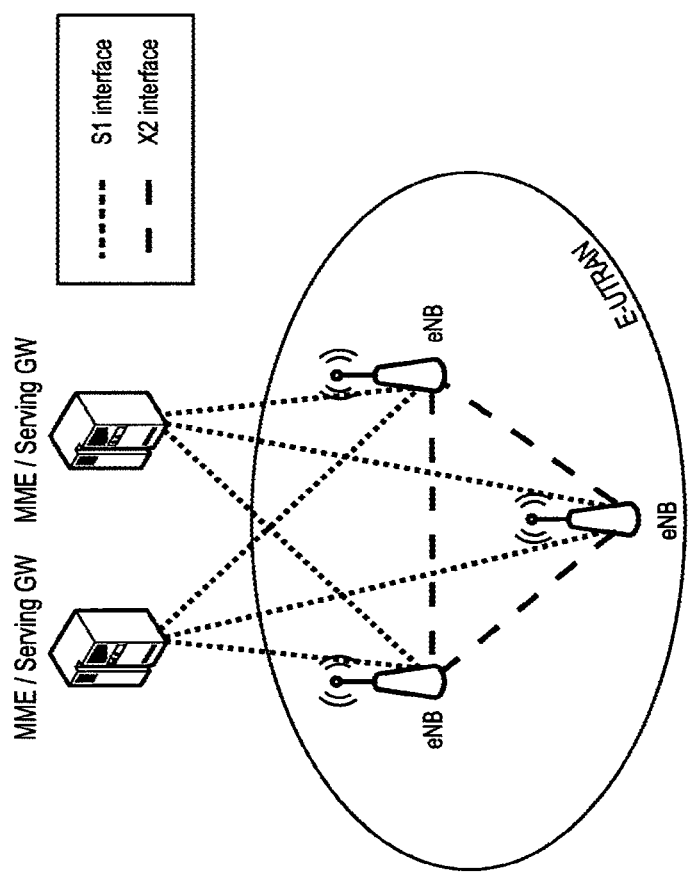
FIG. 2 shows an exemplary overview of the overall E-UTRAN architecture of 3GPP LTE.
Figure 3:
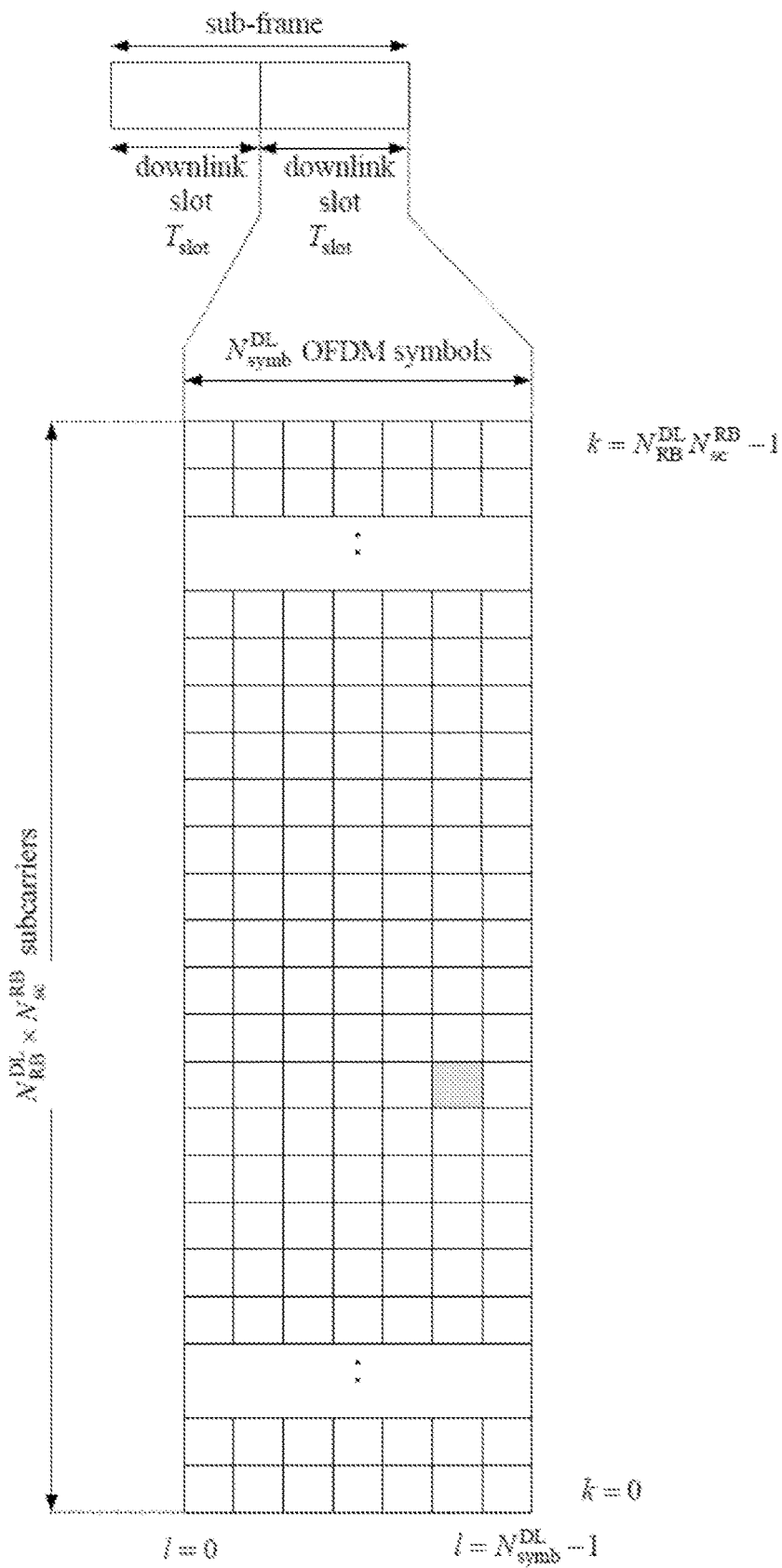
FIG. 3 shows an exemplary sub-frame structure on a downlink component carrier as defined for 3GPP LTE (Release 8/9)
Figure 4:
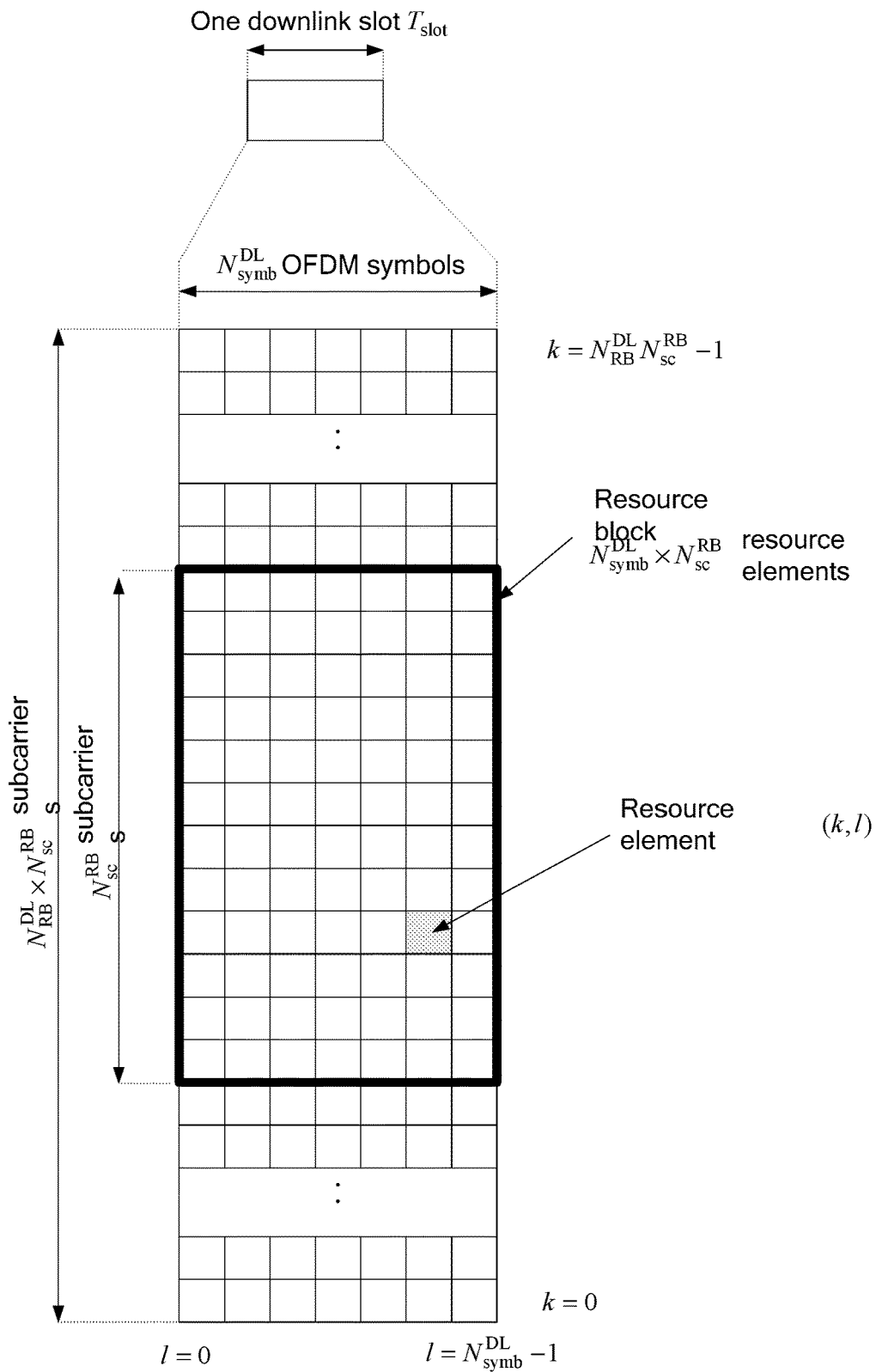
FIG. 4 shows an exemplary downlink resource grid of a downlink slot as defined for 3GPP LTE (Release 8/9)
Figure 5:
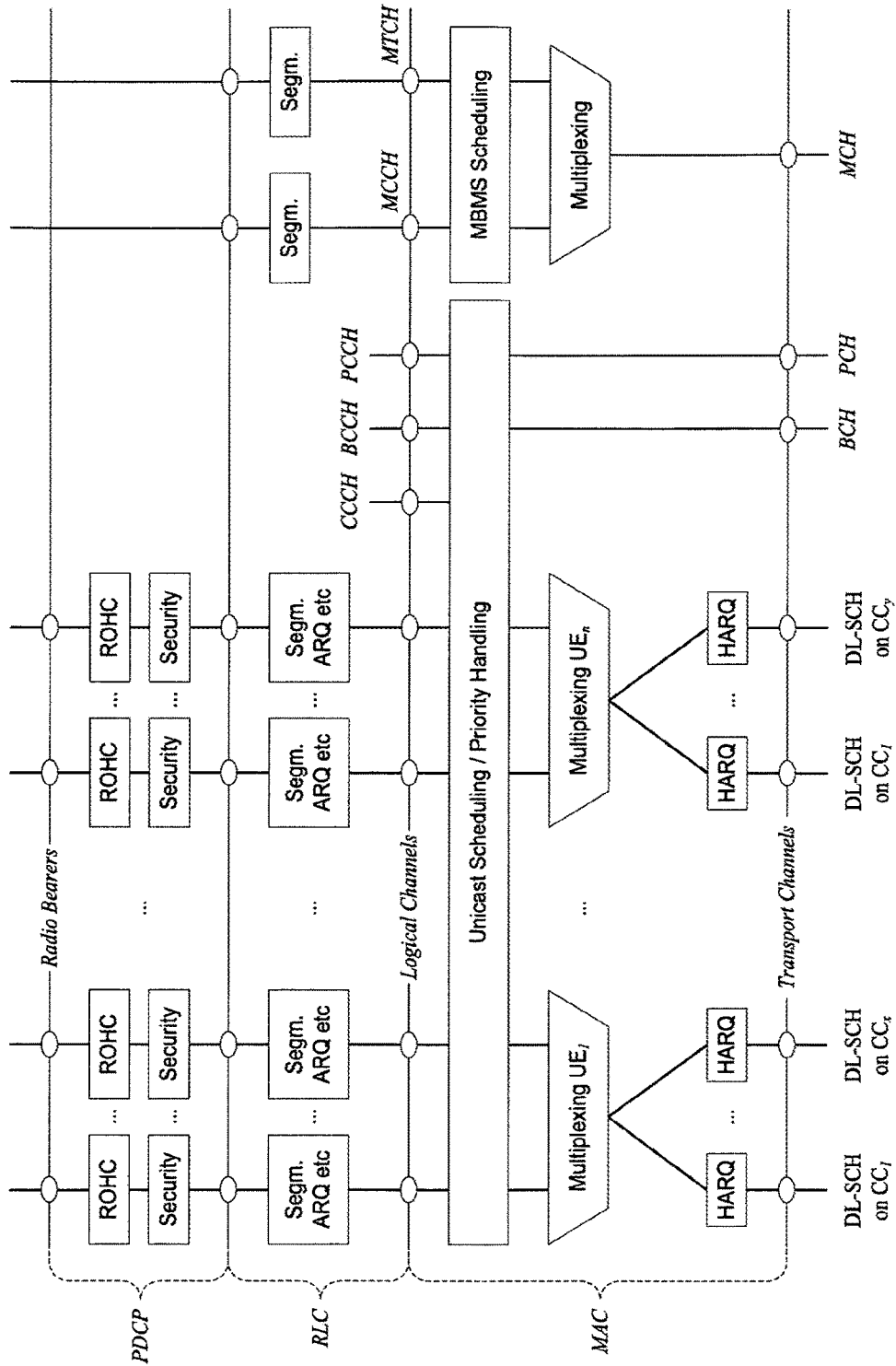
FIGS. 5 & 6 show the 3GPP LTE-A (Release 10) Layer 2 structure with activated carrier aggregation for the downlink and uplink, respectively.
Figure 6:
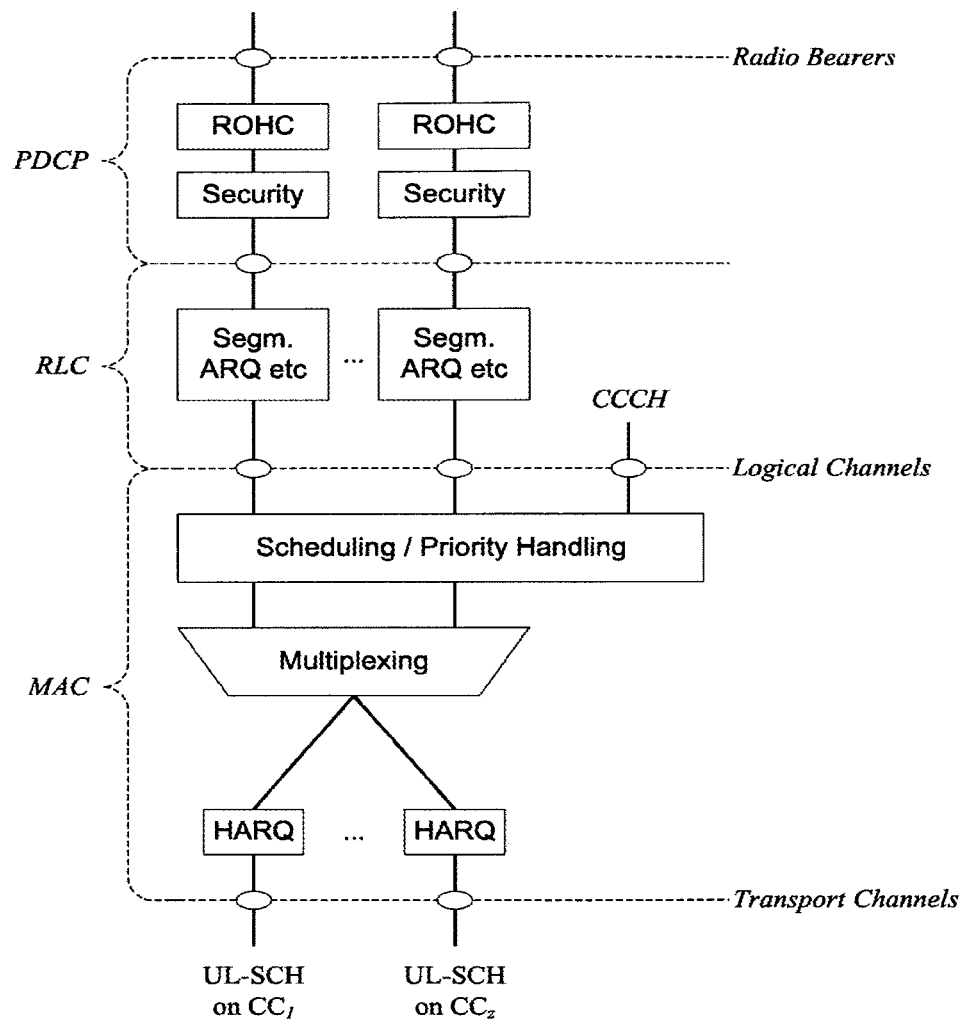
Figure 7:
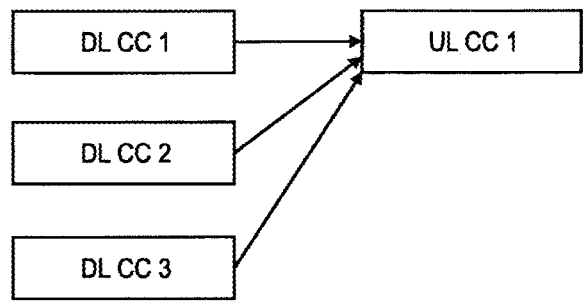
FIGS. 7 & 8 show exemplarily linkages between downlink and uplink component carriers in 3GPP LTE-A (Release 10), FIG. 9 exemplarily shows the dependence of the size of the component carrier (de)activation message from the bandwidth of a component carrier according to an embodiment of the invention and in relation to DCI format 0/1A.
Figure 8:
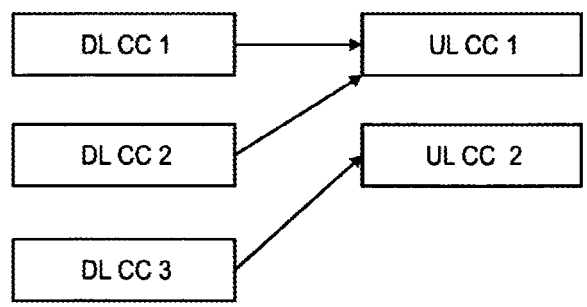

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

One possible implementation to indicate a component carrier in the downlink that is to be activated is the use of the CIF field in the downlink DCI formats of 3GPP LTE-A (Release 10). In case that the CIF field points to a configured but deactivated downlink component carrier, this downlink component carrier is activated. However this approach cannot be used in a straightforward fashion to deactivate a component carrier. Furthermore, the CIF field may not be a mandatory part of the DCI formats.

Another solution for (de)activating configured downlink component carriers is to employ a mechanism similar to the 3GPP LTE (Release 8/9) semi-persistent scheduling (SPS) activation and deactivation. Each user equipment is assigned a UE-specific RNTI (SPS-C-RNTI). In case that the DCI CRC is scrambled with the SPS-C-RNTI, this DCI is interpreted as activation or deactivation message. This mechanism could also be used fro the activation and deactivation of the downlink component carriers. However, this may have a drawback that for each user equipment for which a carrier aggregation is configured, a new separate RNTI would be required. As the total number of RNTIs is limited to 65536, many of these are required for non-carrier-aggregation purposes (e.g. C-RNTI, SPS-C-RNTI, etc) and the number of user equipments in carrier activation should support a large peak number, it would be beneficial to find other methods which do not impose such a requirement.

Another solution for (de)activating configured downlink component carriers and in line with a first aspect of the invention, a signaling format for communicating a component carrier (de)activation message for controlling the activation state of at least one component carrier is provided. The proposed new format of a component carrier (de) activation message allows for an explicit identification of the intended recipient of the component carrier (de)activation message. For example, this identification can be realized by including a mobile terminal identifier (ID) to the component carrier (de)activation message. This mobile terminal ID (also referred to as a UE ID) is for example signaled in a mobile terminal identifier field of the component carrier (de)activation message. In one exemplary implementation the mobile terminal ID indicated in the component carrier (de)activation message is a mobile terminal-specific identifier, such as for example a C-RNTI of the mobile terminal.

In view of the component carrier (de)activation message indicating the intended recipient for the component carrier (de)activation message, it is not longer necessary to unambiguously identify the intended recipient of the component carrier (de)activation message by means of scrambling the CRC of the component carrier (de)activation message with a mobile terminal-specific identifier. The component carrier (de)activation message format can be considered a downlink control information (DCI) format. In the physical layer, the component carrier (de)activation message is downlink control channel information that is mapped to the physical downlink control channel (PDCCH) for transmission to the mobile terminal.

In line with the first aspect of the invention, a CRC is calculated based on the component carrier (de)activation message and is scrambled at the base station. The scrambling is performed at the base station using a component carrier-specific or cell-specific radio network temporary identifier. As indicated above, this implies a significantly reduced number of radio network temporary identifier(s) that need to be reserved for controlling the (de)activation state of the configured component carriers.

As mentioned in the previous paragraph, the component carrier (de)activation message format may be considered a new format of downlink control channel information that is mapped to the physical downlink control channel (PDCCH). The component carrier-specific or cell-specific radio network temporary identifier(s) used for scrambling the CRC of a component carrier (de)activation message thus indicate the format of the downlink control channel information being a component carrier (de)activation message.

Furthermore, in case of using component carrier-specific radio network temporary identifier(s) that is/are linked to a respective component carrier, carrier-specific radio network temporary identifier(s) also indicate(s) a component carrier to be activated or deactivated. Hence, the component carrier (de)activation message as well as the CRC attachment (i.e. the CRC for the component carrier (de)activation message scrambled with a given radio network temporary identifier) indicate to the mobile terminal the desired activation state of the component carriers, i.e. indicate which of them is/are to be (de)activated.

A further solution for (de)activating configured downlink component carriers and in line with a second aspect of the invention, the component carrier (de)activation message is provided within a transport block in the physical downlink shared channel (PDSCH). The transport block is thus transmitted as (part of) a scheduled transmission on the PDSCH to the mobile terminal. The component carrier (de)activation message may be multiplexed with other data of logical channels to the transport block. Furthermore, the component carrier (de)activation message may be optionally assigned a logical channel identifier (LCID).

Similar to the solutions in line with the first aspect of the invention, the component carrier (de)activation message comprises (de)activation information that indicate for the respective downlink component carriers configured by the mobile terminal, the activation state of the respective component carriers and which allow the mobile terminal recognize a change in the activation state of the respective downlink component carriers. The detection of such change of the activation state for one or more downlink component carriers will cause the mobile terminal to activate or deactivate the effected configured downlink component carrier(s) accordingly. In one exemplary implementation, the (de)activation information for the component carriers may be provided in a MAC control element, i.e. by means of MAC signaling.

Furthermore, still in line with this second aspect of the invention, the (de)activation information may be provided in form of a bitmap. The individual bits of the bitmap indicate the activation state of a respective configured downlink component carrier associated to a respective bit of the bitmap.

A further aspect of the invention is to trigger the signaling of sounding reference signals (SRSs) in the uplink. This may be done by means of an individual signaling message or together with the (de)activation of configured component carriers. In case of using an individual signaling message, a SRS (de)activation message may be defined. This SRS (de)activation message may reuse the different structures and mechanisms for transmitting the component carrier (de)activation message according to the various embodiments described herein. For example, the SRS (de)activation message may comprise SRS (de)activation information that indicated the activation state of the SRS transmission for the uplink component carriers configured for the mobile terminal.

This SRS (de)activation information may be structured similarly to the component carrier (de)activation information. For example, the SRS (de)activation information may be provided in form of a bitmap. The individual bits of this bitmap may indicate the activation state SRS signaling on the respective configured uplink component carrier associated to a respective bit of the bitmap. Alternatively the bits of the bitmap in the SRS (de)activation message may also be considered associated to respective configured downlink component carriers, and the logical values of the individual bits of the bitmap indicate the activation state of SRS signaling on the uplink component carrier linked to the respective downlink component carrier associated to the given bit in the bitmap.

The SRS (de)activation message may be signaled as part of a transport block on the physical uplink shared channel as described herein in the embodiment in line with the second aspect of this invention) or may be signaled as a new format of downlink control channel information that is mapped to the physical downlink control channel (PDCCH) as described herein in the embodiment in line with the first aspect of the invention.

Moreover, the SRS (de)activation information may also be sent together with (de)activation information for activating/deactivating configured downlink component carriers within a single message. In one exemplary embodiment of the invention, the SRS (de)activation information and the component carrier (de)activation information are signaled in a MAC control element as part of a transport block of the physical downlink shared channel. In a further exemplary embodiment, the SRS (de)activation information and the component carrier (de)activation information are signaled together in a new format of downlink control channel information that is mapped to the physical downlink control channel (PDCCH) as described herein in line with the first aspect of the invention.

Please note that the principles for component carrier (de)activation may be applied for the activation and deactivation of downlink and uplink component carriers. In this respect it should be further noted that it is assumed in the exemplary embodiments and implementations of the invention, that a component carrier could be defined to be in one of the following three activation states: non-configured, configured but deactivated and active. Moreover, it is also important to notice that In cases where there is a downlink (and/or uplink) component carrier configured for the mobile terminal that is always active, the (de)activation information does not need to indicate the activation state for such "always active" component carrier—an "always active" component carrier is also referred to as the primary component carrier (PCC) herein.

Exemplarily considering downlink component carriers, when a downlink component carrier is configured but deactivated, the user equipment does not need to receive the corresponding PDCCH or PDSCH, nor is it required to perform CQI measurements. Conversely, when a downlink component carrier is active, the user equipment shall receive PDSCH and PDCCH (if present), and is expected to be able to perform CQI measurements. After configuration of component carrier(s) same is/are in configured but deactivated state. In order to enable PDCCH and PDSCH reception on a downlink component carrier, the downlink component carrier needs to be transitioned from configured but deactivated state to active state. The configuration of a component carrier may alternatively implicitly or explicitly activate the component carrier, in which case the component carrier needs to be transitioned from active ("configured and active") state to configured but deactivated state in order to save processing resources and/or signaling.

When an uplink component carrier is configured and activated, it is assumed to be eligible for transmission of signals and channels such as ACK/NACK, sounding reference symbols, scheduling request, and periodic CQI reports. Conversely, when the downlink component carrier is in configured but deactivated state, the uplink component carrier is assumed to be completely muted and not eligible for transmission of uplink signals and channels such as the above.

The new proposed component carrier (de)activation according to the various embodiments of the invention described herein may therefore be used for indicating state transitions between configured but deactivated state and active state ("configured and activated").

Figure 16:
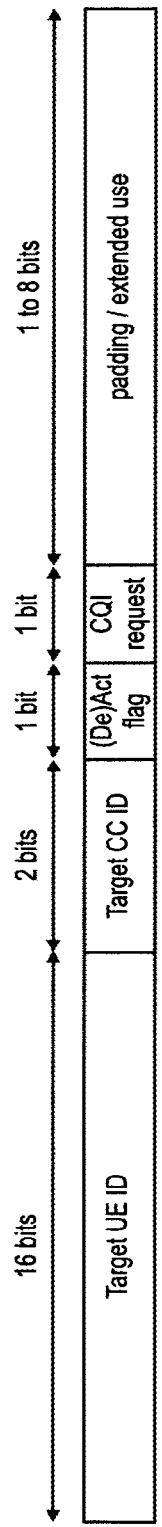

As outlined above, one aspect of the invention is the proposal of a new component carrier (de)activation message for (de)activating one or more uplink or downlink component carriers. According to one embodiment of the invention related to the implementation of the concepts of this invention in a 3GPP based system using carrier aggregation in downlink and/or uplink, the format for the new component carrier (de)activation message is a DCI format. The new component carrier (de)activation message contains at least a target UE ID, such as for example the C-RNTI of the user equipment to which the new component carrier (de)activation message is destined. Furthermore, in case the component carrier(s) to which the new component carrier (de)activation message pertains is/are not implicit to the RNTI used for scrambling the CRC of the new component carrier (de)activation message, the new component carrier (de)activation message further contains a target component carrier ID. An example for a component carrier (de)activation message according to one embodiment of the invention including a CQI request flag is shown in FIG. 16. The remaining bits available in the component carrier (de)activation message may be used to signal further information or requests to the mobile terminal as will be discussed below, or may be filled with padding or reserved bits.

This target component carrier ID may be for example signaled in a field of the new component carrier (de) activation message, which has a size of $\lceil \log_2(N-1) \rceil$ bits, given that there is one always-active component carrier in the downlink/uplink, the so-called anchor carrier, which cannot be activated/deactivated by this message, and where N is the number of configured downlink/uplink component carriers and $\lceil x \rceil$ is the ceiling function, i.e. the smallest integer number that is larger than or equal to x. Hence, for a typical downlink scenario, one can assume that there are up to N=5 configured downlink component carriers, one of them being defined as the anchor carrier, so that a total of 2 bits would be needed for the target component carrier ID in the component carrier (de)activation message.

Furthermore, according to a further aspect and embodiment of the invention, no user equipment-specific RNTI is used to scramble the CRC for the component carrier (de) activation message, when mapping the component carrier (de)activation message as downlink control channel information to the PDCCH. This becomes possible since the target UE ID is part of the payload of the component carrier (de)activation message. Instead, the RNTI(s) used for signaling messages related to the (de)activation of component carriers, such as the component carrier (de)activation message, is either a cell-specific RNTI or a component carrier-specific RNTI.

If the scrambling of the CRC is using a single cell-specific RNTI defined for the signaling of messages relates to the (de)activation of component carriers, such as the component carrier (de)activation message, the component carrier (de) activation message's payload further includes information for which component carrier the (de)activation command should be applied. For this purpose, the component carrier (de)activation message may comprise one or more target component carrier IDs to indicate one or more component carriers in the downlink or uplink, which should be activated or deactivated. The base station may indicate the cell-specific RNTI for component carrier (de)activation to the mobile terminal by RRC signaling, e.g. as part of a component carrier configuration message.

Figure 11:
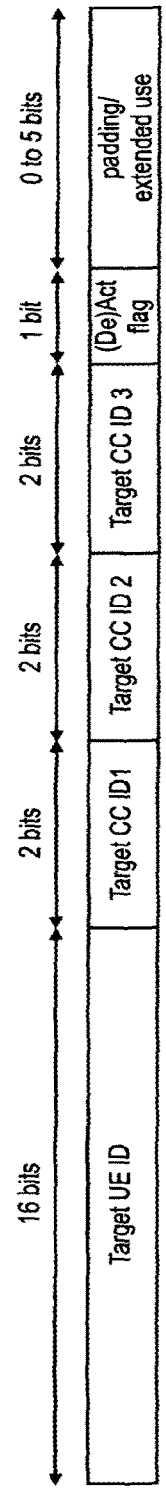

In case the one or all component carriers indicated in the component carrier (de)activation message should be (simultaneously) activated or deactivated, the component carrier (de)activation message may comprise an additional activation/deactivation flag to indicate whether the one or more component carriers are to be activated or deactivated. Another example for a component carrier (de)activation message according to a further embodiment of the invention including multiple target component carrier IDs and a single activation/deactivation flag is shown in FIG. 11.

Figure 12:
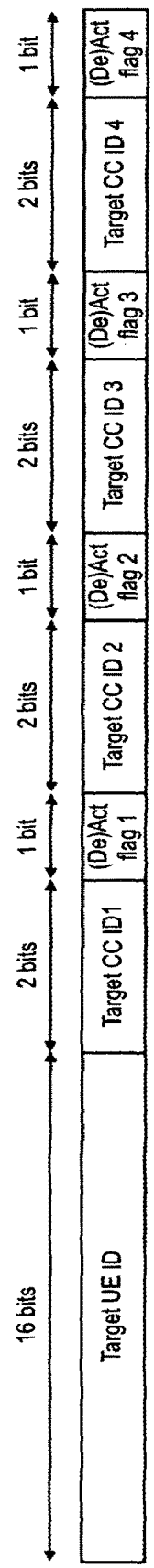

In an alternative implementation according to a further embodiment, the component carrier (de)activation message comprises an activation/deactivation flag for each target component carrier ID indicated in the target component carrier IDs. This way, the base station can control the mobile terminal to individually activate or deactivate the respective component carrier(s) indicated by the target component carrier ID(s). Please note that it is a matter of definition of whether the target component carrier ID and a corresponding activation/deactivation flag is considered two fields of the component carrier (de)activation message or whether the two information is provided in a single signaling component carrier activation/deactivation field. An example for a component carrier (de)activation message according to one embodiment of the invention including multiple target component carrier IDs and activation/deactivation flags is shown in FIG. 12.

Figure 13:
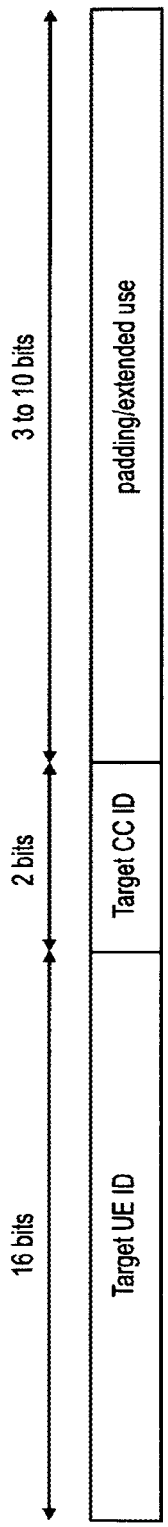

Furthermore, in another embodiment of the invention, there are two cell-specific RNTIs defined for the signaling of messages relates to the (de)activation of component carriers, such as the component carrier (de)activation message. In this case one of the two RNTIs (Activation RNTI) can be used to indicate the activation of the component carrier(s) indicated by means of one or more target component carrier IDs in the component carrier (de)activation message. Likewise, the other one of the two RNTIs (Deactivation RNTI) can be used to indicate the deactivation of the component carrier(s) indicated by means of one or more target component carrier IDs in the component carrier (de)activation message. Therefore, no additional activation/deactivation flag is needed in the payload of the component carrier (de)activation message in this exemplary implementation. The base station may indicate the Activation RNTI and Deactivation RNTI for component carrier (de)activation and their respective function (activation/deactivation) to the mobile terminal by means of RRC signaling, e.g. as part of a component carrier configuration message. An example for a component carrier (de)activation message according to an embodiment of the invention including a target component carrier ID but no activation/deactivation flags is shown in FIG. 13.

Figure 18:
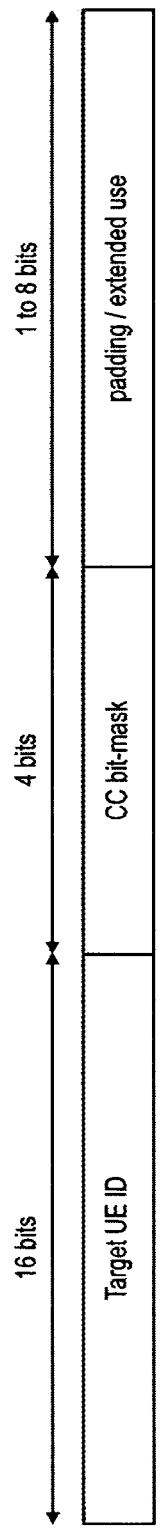

In another embodiment of the invention, one or two cell-specific RNTIs may be used as described above. Instead of indicating individual component carrier to be activated by means of the target component carrier IDs (and using respective activation/deactivation flags), a bit-mask is signaled in the component carrier (de)activation message to indicate the activation state of each configured downlink/uplink component carrier. An example for a component carrier (de)activation message for the (de)activation of downlink/uplink component carriers is shown in FIG. 18. The bit-mask is comprises in the CC bit-mask field. The bit-mask consists of N−1 bits, where N is the number of configured downlink/uplink component carriers. If there are N=5 configured component carriers, the bit-mask has a size of 4 bits. Please note that only N−1 bits are required, if assuming that there is always one active downlink component carrier in the uplink and downlink for a mobile terminal in connected mode. Each of the bits in the bit-mask is linked to a corresponding configured component carrier in the downlink/uplink. The logical value 1 of a bit of the bit-mask may indicate the configured downlink component carrier associated to the bit being active, while the logical value 0 of a bit of the bit-mask may indicate the corresponding configured downlink component carrier associated to the bit being configured but deactivated (or vice versa). The use of the (de)activation message according to this embodiment of the invention has the benefit that a single DCI payload can activate and deactivate several component carriers simultaneously.

The association between the respective association between the bits of the bit-mask (or the codepoints of the bit-mask field) and a component carrier may be for example configured for each mobile terminal a higher layer, e.g. RRC, configuration message.

In accordance with a further embodiment of the invention a component carrier-specific RNTI is used for scrambling the CRC. In this embodiment, each of the configured component carriers in the downlink or uplink is assigned a specific RNTI. The component carrier-specific RNTIs may also be defined per-cell, so that they can be considered a sub-class of the cell-specific RNTIs. Please note that the anchor carrier may also be assigned a component carrier-specific RNTI, as different mobile terminals may have different anchor carriers in a cell controlled by a base station.

The mobile terminal may be informed by the base station on the correspondence of component carrier-RNTIs and component carriers. The correspondence information may for example be signaled to the mobile terminal via RRC signaling, e.g. as part of the component carrier configuration message. One benefit of the use of component carrier-specific RNTI(s) is that a mobile node that is not configured to monitor component carrier-specific RNTI(s) for the (de)activation of component carriers, cannot falsely (de)activate a component carrier in case of a corrupted DCI message. Furthermore, in addition to the component carrier-specific RNTI(s) also the target UE ID in the (de)activation message has to match, so that a false (de)activation of a component carrier is less likely.

Figure 14:
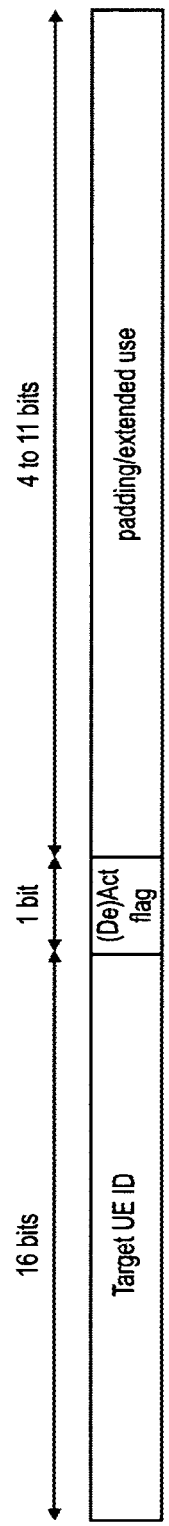

In this case, the component carrier-specific RNTI used by the base station for scrambling the CRC of the component carrier (de)activation message already indicates to the mobile terminal the component carrier to which the (de)activation command of the component carrier (de)activation message pertains. Hence, the component carrier (de)activation message may not include a target component carrier ID in this case. Nevertheless, the component carrier (de)activation message may still include the activation/deactivation flag to indicate the activation state to be set for the component carrier indicated by the component carrier-specific RNTI. An example for a component carrier (de)activation message according to an embodiment of the invention an activation/deactivation flag for the downlink component carrier implicit to the component carrier-specific RNTI used for scrambling the CRC is shown in FIG. 14.

Figure 15:
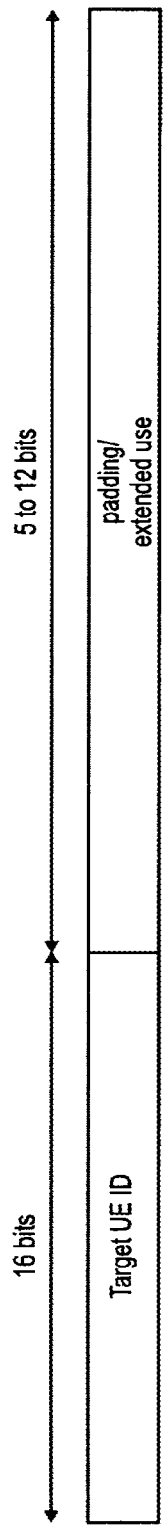

In another alternative embodiment, there are two components carrier-specific RNTIs defined for each component carrier for scrambling the CRC of component carrier (de)activation related messages, such as the proposed component carrier (de)activation message. Similar to the example above, one of the two component carrier-specific RNTIs (Activation RNTI) is indicating to activate the component carrier linked to the component carrier-specific RNTI, while the other one of the two component carrier-specific RNTIs (Deactivation RNTI) is indicating to deactivate the component carrier linked to the component carrier-specific RNTI. This way, the component carrier (de)activation message may only need to signal the UE ID to destine the component carrier (de)activation related message to the correct recipient (user equipment), while the component carrier to be (de)activated is implicit to the use of the RNTI for scrambling the CRC of the component carrier (de)activation related message. Please note that also in this case the base station may indicate the correspondence of Activation RNTIs and Deactivation RNTIs for the different component carriers by means of RRC signaling, e.g. as part of a component carrier configuration message. An example for a component carrier (de)activation message according to an embodiment of the invention only comprising the target UE ID and optionally further information and request (Extended Usage) is shown in FIG. 15.

Irrespective of whether (a) cell-specific or component carrier-specific RNTI(s) are used, these RNTIs may be signaled to the mobile terminals by means of RRC signaling or other means of sending control information related to the carrier aggregation mode. In particular, when configuring the terminal to which component carrier(s) it should consider as being "configured", the mobile terminal is also notified which RNTI(s) to use for one or more such configured component carriers.

Furthermore, in a 3GPP based communication system using OFDM on the downlink, it can be assumed that the component carrier (de)activation message is forming the payload (DCI) of a PDCCH transmitted within a sub-frame on a downlink component carrier to one or more user equipments and the user equipments perform a blind decoding on the different DCI formats signaled in a sub-frame on PDCCH. Using the same size as at least one other DCI format defined in the communication system for the component carrier (de)activation message format, and using an implicit this format by means of the cell-specific or component carrier specific RNTI(s), it is possible not to increase the blind decoding efforts of a mobile terminal.

As the format of the component carrier (de)activation message is thus assumed to have a given size, the remaining bits not needed to signal the UE ID and the component carrier (de)activation related information such as target component carrier ID(s) and activation flag(s) may be for example used to signal further information or requests to the mobile terminals. Please note that in the different examples described above explaining how cell-specific or component carrier specific RNTI(s) can be used, some allow to avoid the signaling of target component carrier ID(s) and/or activation/deactivation flag(s), so that the size of the component carrier (de)activation related information may be minimized (or even avoided). Moreover, the size of the component carrier (de)activation message format may be either constant (fixed) or may depend on the component carrier bandwidth, e.g. the bandwidth of the (de)activated component carrier, the bandwidth of the component carrier in the downlink on which the component carrier (de)activation message is signaled, or the linked uplink component carrier of the downlink on which the component carrier (de)activation message is signaled.

In one exemplary implementation, the size of the component carrier (de)activation message format is corresponding to the size of DCI formats 0/1A in 3GPP LTE (Release 8/9) or 3GPP LTE-A (Release 10). The format size may optionally depend on the component carrier bandwidth.

In this context, Table 4 illustrates the sizes of formats 0/1A in 3GPP LTE (Release 8/9) (as known from 3GPP TS 36.212 mentioned previously herein) depending on the component carrier bandwidth:

TABLE 4

| System Bandwidth [MHz] | Size of DCI format 0/1A in FDD [bits] | Size of DCI format 0/1A in TDD [bits] |
| --- | --- | --- |
| 1.4 | 21 | 23 |
| 3 | 22 | 25 |
| 5 | 25 | 27 |
| 10 | 27 | 29 |
| 15 | 27 | 30 |
| 20 | 28 | 31 |

If a CIF field is added these formats 0/1A, as defined in 3GPP LTE-A (Release 10), the size of formats 0/1A in 3GPP LTE-A (Release 10) has additional three bits more to account for the CIF field.

Hence, as apparent from the different examples given above, the minimum information that needs to be signaled in the component carrier (de)activation message is the target UE ID to identify the intended recipient of the component carrier (de)activation message. If the target UE ID is a C-RNTI of the destined user equipment, this means that 16 bits are required for the target UE ID. For each target component carrier ID, additional $\lceil \log_2(N-1) \rceil$ bits are required. Each activation/deactivation flag requires one additional bit.

For example, in case of using one single cell-specific RNTI for identifying the DCI format, assuming that there are N=5 configured component carriers, of which N−1=4 need to be indicated in the target component carrier ID field (the anchor carrier is always in active state) and that the activation state for one component carrier is to be signaled only, this would imply that the DCI payload of the component carrier (de)activation message requires 16 bits for the cell-specific RNTI (target UE ID), 2 bits for the indication of the target component carrier (target component carrier ID) and one bit of the activation/deactivation flag ((De)Act flag), which is 19 bits in total. Hence, assuming the smallest component carrier bandwidth of 1.4 MHz at least two "extra" bits are available for further use. If the activation/flag can be omitted due to using two cell-specific RNTI for identifying the DCI format and the activation state, even three additional bits would be unused for the smallest component carrier bandwidth of 1.4 MHz.

In another embodiment of the invention, and in accordance with the second aspect of this invention, the component carrier (de)activation message is provided within a transport block on the physical downlink shared channel (PDSCH). For example, the component carrier (de)activation message may be a MAC signaling message for activating and deactivating downlink component carriers. In one exemplary implementation, the component carrier (de)activation message is provided in form of a new MAC control element identified by a specific LCID. This new MAC control element carries the (de)activation information of which configured downlink component carrier(s) of the mobile terminal shall be activated and/or deactivated.

The MAC control element for the component carrier (de)activation message may be octet aligned, i.e. consist of a multiple of 8 bits (1 byte). The actually size of the MAC control element for the component carrier (de)activation may be determined by the number of downlink component carriers that can be configured in the user equipment. If there is a an always active primary component carrier provided, as for example in an 3GPP LTE-A (Release 10) system, this number of downlink component carriers is the number of secondary component carriers that can be configured in the user equipment.

In one exemplary embodiment, the (de)activation information within the component carrier (de)activation message is provided as a bitmap. Each bit of the bitmap represents an activation/deactivation flag for one of the downlink component carriers (or secondary component carriers, if a primary component carrier is provided). For example, a bit set to 0 could mean that the corresponding component carrier is to be deactivated and the bit set to 1 could mean the activation of the component carrier, or vice versa.

Alternatively, the bits of the bitmap may also indicate the activation state of the component carriers associated to the respective bits. For example, a bit set to 0 could mean that the activation state of the corresponding component carrier is the configured but deactivated state and the bit set to 1 could mean the activation state of the component carrier is active state ("configured and activated"), or vice versa. In this case, the mobile terminal would determine whether there is a change of the activation state for a component carrier and activates or deactivates the respective component carrier accordingly. If the number of downlink component carriers that need to be distinguished in the is lower than nine, only one octet of payload is needed for signaling the bitmap.

For example currently in 3GPP standardization with respect to 3GPP LTE-A (Release 10), it is assumed that a maximum of five component carriers in the downlink can be aggregated. One of these five downlink component carrier is designated as the downlink primary component carrier, which is always active and hence cannot be activated or deactivated. This would leaves four additional downlink secondary component carriers (SCCs) in the downlink that can be configured in a user equipment and thus can be activated/deactivated. Hence, in one exemplary embodiment of the invention, the bitmap has a size of four bits corresponding to the maximum of four downlink secondary component carriers. This leaves four additional bits for further signaling in the MAC control element that may be used for triggering the transmission of SRSs and/or power headroom reports (PHRs) by the user equipment.

Figure 25:
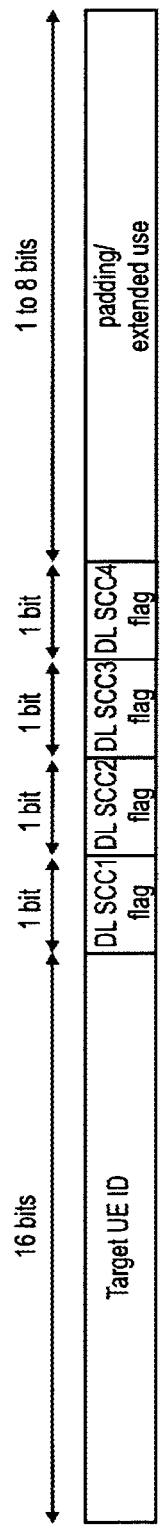
FIGS. 25 & 26 show different formats of the component carrier (de)activation message according to different embodiments of the invention.

An exemplary component carrier (de)activation message that is defining a new DCI format for transmission on the PDCCH and for use in a 3GPP LTE-A (Release 10) is shown in FIG. 25. Similar to the other DCI exemplary formats proposed herein, the messages comprises an identification of the target user equipment. Furthermore, there are 4 flags provided that form the bitmap. Each of the flags is associated to a respective downlink component carrier and is used for (de)activation thereof as outlined above. Please note that this 4 bit-bitmap may also form the payload of a MAC control element that is used to implement the component carrier (de)activation message.

Furthermore, it may be advantageous to ensure that there is a one to one mapping between each bit of the bitmap and the corresponding component carrier it refers. This type of correspondence may be for example realized by using the component carrier index (CI) used in component carrier configuration message transmitted via RRC. For instance, the highest bit (first bit) of the bitmap could refer to the highest (or lowest) component carrier index, the second highest (second bit) of the bitmap could refer to the second highest (second lowest) component carrier index, etc. This way a one-to-one correspondence between the individual bit positions in the bitmap and the component carriers they refer to can be established.

As mentioned above, component carrier (de)activation message, e.g. in form of an MAC control elements, is included in the transport block in the PDSCH of one of the downlink component carriers. Hence, for reception of the component carrier (de)activation message, the user equipment needs to successfully decode the transport block in order to "obtain" the (de)activation information. The transport block containing the component carrier (de)activation message (as well as other transport blocks on the PDSCH) may be transmitted using an HARQ protocol in order to ensure its successful delivery and decoding at the user equipment. If the transport block is not decoded successfully by the user equipment's decoder, HARQ retransmissions for a transport block (including the component carrier (de)activation message) increase the time between actual issuing of a (de)activation command by the eNodeB and the reception of the (de)activation command at the user equipment. In the case of using a MAC control element for component carrier (de)activation this could mean delayed activation and deactivation with possible negative effects on scheduling and power saving of the user equipment.

In order to minimize the possibility of retransmissions, and thus avoiding the possible negative effects mentioned above, the transmission of the component carrier (de)activation message may be for example restricted to the most reliable of the downlink component carriers. In actual deployments this most reliable component carrier may be— in most cases—the primary component carrier (PCC) of the user equipment. The PCC is also associated with Radio Link Failure (RLF), therefore it needs to be a reliable component carrier since otherwise the user equipment could not establish a reliable connection to the network. Furthermore, it is the only component carrier that is always active, i.e. cannot be deactivated or activated. Hence, in one implementation example, the component carrier (de)activation message is transmitted by the eNodeB on the user equipment's PCC to the user equipment. Hence, if the component carrier (de) activation message is implemented as a MAC control element, the transmission of the MAC control element for component carrier (de)activation to the PCC reduces the chances of delayed activation and deactivation of the secondary component carriers of the user equipment.

In the sections above (de)activation of configured downlink component carriers using either L1 signaling (i.e. a new DCI format on the PDCCH) or L2 signaling (i.e. signaling the component carrier (de)activation message in a transport block on the PDSCH, e.g. in form of a MAC control element) have been described. The following considerations apply to both aspects of this invention.

When eNodeB is deactivating a configured downlink component carrier, the user equipment may deactivate the indicated component carriers immediately after reception of the deactivation command (component carrier deactivation message). If the user equipment receives a deactivation message for a configured component carrier where the transmission of a transport block using the HARQ protocol (i.e. one of the HARQ processes is (re)transmitting a transport block on the PDSCH when receiving the deactivation command) is not finished, i.e. retransmissions are still pending for the transport block, the immediate deactivation of the component carrier would stop HARQ retransmission and the transport block would be lost.

As the HARQ protocol of Layer 2 is also terminated in the eNodeB, the eNodeB is aware of the ongoing HARQ retransmissions of the user equipment on the configured downlink component carrier and may thus not deactivate a component carrier, where a transport block has not yet successfully received by the user equipment, i.e. not yet (positively) acknowledged by the user equipment. This would have however imply that the eNodeB may need to send an individual deactivation messages for each component carrier, even though when deactivation would be possible to be sent within one signaling message, since the HARQ operation on the different downlink component carriers and HARQ processes of the HARQ protocol may not be aligned.

Therefore, in another embodiment of the invention, in order to allow eNodeB to combine several deactivation commands within one signaling message without causing loss of transport blocks, the user equipment is not deactivating a component carrier right after receiving a deactivation command for the given configured component carrier. Instead, the user equipment determines the HARQ protocol status for the component carrier (i.e. determines whether there are still any retransmission(s) of a transport block(s) pending) and deactivates the component carrier upon a pending transmission having been successfully finished (i.e. having been (positively) acknowledged by the user equipment or the maximum number of retransmissions has been reached for the pending transmission.

This operation of the downlink component carrier deactivation is also advantageous in terms of the eNodeB not needing to wait for an acknowledgement on each of the transmissions ongoing on the component carriers to be deactivated, so that the actual deactivation command for a component carrier can occur several sub-frames (TTIs) earlier since the user equipment does not need to wait for the acknowledgement of the last transmission.

Especially when (de)activation signaling is done by MAC signaling this is beneficial for power saving at the user equipment.

In the following paragraphs, different exemplary implementations and embodiments regarding the design of the component carrier (de)activation message format will be discussed in further detail.

Figure 9:
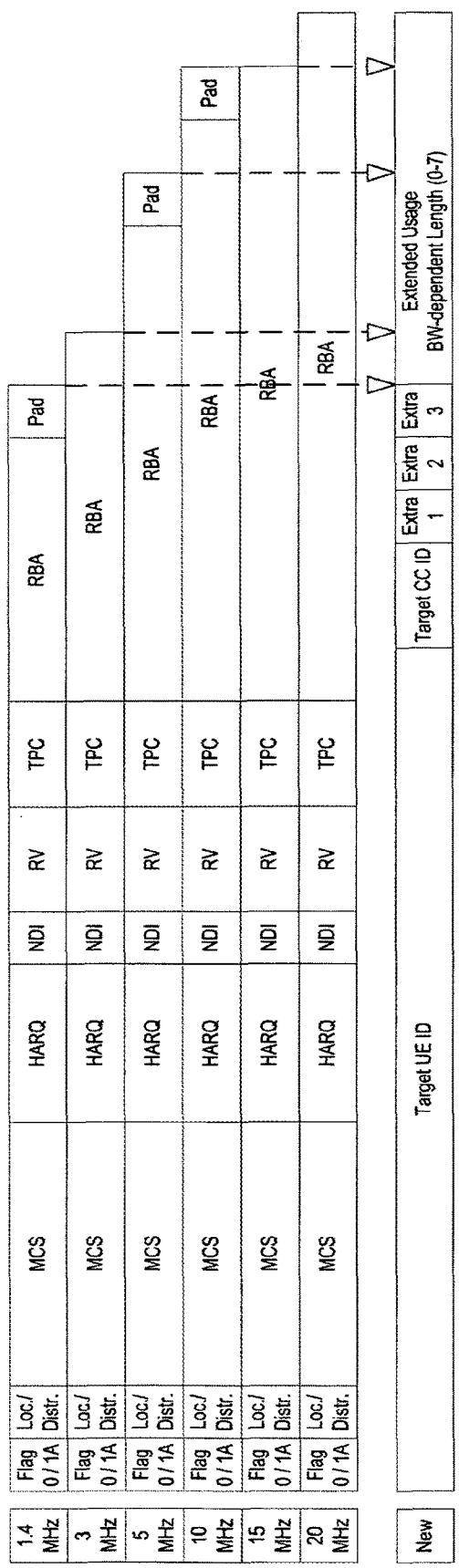
Figure 10:
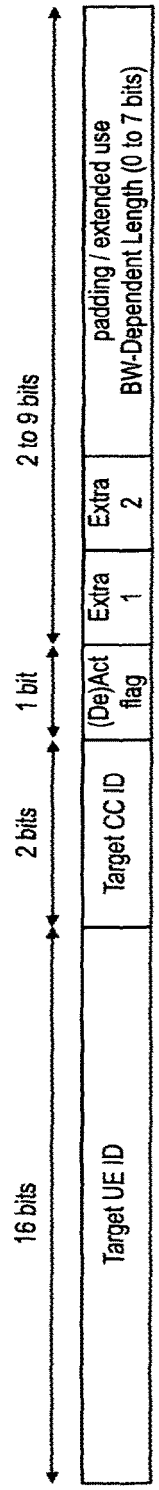
FIGS. 10 to 19 show different formats of the component carrier (de)activation message according to different embodiments of the invention.

In one exemplary implementation of the component carrier (de)activation message format (i.e. the DCI format) is used for controlling the activation state of one downlink component carrier configured by a mobile terminal. In this embodiment, one of the "Extra" bits/flags as for example shown in FIG. 9 or FIG. 10 is used to request the mobile terminal to send channel quality feedback for the controlled downlink component carrier. This may be especially suitable in situations where the downlink component carrier is activated (configured but activated state active state). For this purpose the component carrier (de)activation message comprises in its payload a "CQI request flag", that when set triggers the provision of channel quality feedback for the downlink component carrier activated by the component carrier (de)activation message. An example for a component carrier (de)activation message according to one embodiment of the invention including a CQI request flag is shown in FIG. 16.

In one more detailed implementation example according to an embodiment of the invention, the channel quality feedback in form of CQI, PMI (Precoding Matrix Indicator) or RI (Rank Indicator) could be transmitted on resources of a physical uplink control channel (PUCCH). If considering an implementation in a 3GPP based system, like 3GPP LTE-A (Release 10), the possible PUCCH payload may be quite restricted since a single resource block shares PUCCHs from multiple user equipments. Therefore, the channel quality feedback may for example signal a wideband CQI/PMI assuming a Rank=1 transmission.

The transmission of the channel quality feedback message can further be considered by the base station as an acknowledgement for the mobile terminal having successfully received the component carrier (de)activation message, respectively for the mobile terminal having executed the activation command comprised in the component carrier (de)activation message.

Furthermore, the channel quality feedback (e.g. the CQI/PMI) may be sent by the mobile terminal a known time interval (e.g. 4 ms) after having received the sub-frame (PDCCH) containing the component carrier (de)activation message. In 3GPP LTE (Release 8/9) in FDD mode, the time span between reception of a sub-frame (PDCCH) and a corresponding uplink transmission is 4 ms (for TDD the time span determination as more complicated). The time span between reception of the sub-frame (PDCCH) containing the component carrier (de)activation message and the transmission of channel quality feedback in uplink may alternatively be configured by RRC signaling. For instance, it may be desirable to give the mobile terminal more than 4 ms (e.g. 8 ms or 12 ms) to send the channel quality feedback, in order to allow the mobile terminal to perform an accurate channel quality measurement to obtain an adequate accuracy of the CQI/PMI after activating the respective downlink component carrier(s).

As to the uplink resources for the transmission of the channel quality feedback, the resource on the PUCCH may be for example the same PUCCH resource that is given to the mobile terminal for the periodic CQI reporting. This PUCCH resource may be configured by the base station via RRC signaling when configuring the downlink/uplink component carrier.

Figure 17:
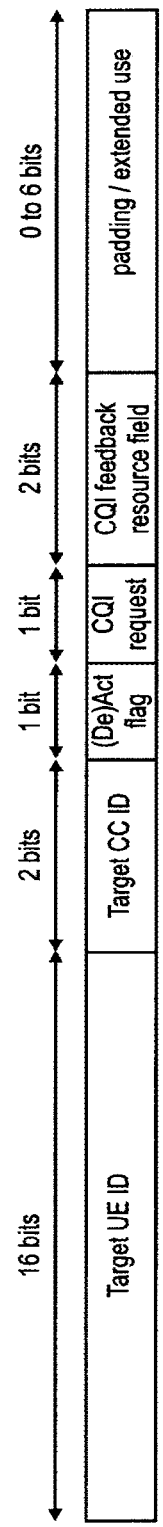

Alternatively, the channel quality feedback may also be transmitted on a PUCCH or PUSCH resource that is predetermined by the base station, e.g. as part of the RRC component carrier configuration message. A further alternative is that the uplink resource for transmitting the channel quality feedback is indicated by one or more of the "extra" bits that are available in the payload of the component carrier (de)activation message. This implementation can be beneficially exploited in case of a large component carrier bandwidth (as discussed above with respect to FIG. 9 and Table 4), where several bits may be unused and available to specify the feedback resources in the uplink. The two latter alternatives may also be combined in that the RRC component carrier configuration message configures a set of uplink resources for the channel quality feedback (CQI/PMI/RI), and the (de)activation message comprises a feedback resource field that selects one out of the available configured uplink resources. An example for an extended component carrier (de)activation message including a CQI request flag and a CQI feedback resource field is shown in FIG. 17.

Moreover, in case that the uplink resource for the channel quality feedback is signaled or pre-configured, the channel quality feedback is preferably determined according to the configured aperiodic CQI mode and/or the configured downlink transmission mode of the downlink component carrier that is indicated by the component carrier (de)activation message.

Furthermore, in another embodiment, channel quality feedback may also be multiplexed with further physical layer messages or signals, such as HARQ feedback (ACK/NACK), SR or SRS, on the assigned uplink resource. In case only physical layer messages but no transport block data is signaled on the uplink resource, no HARQ process (HARQ protocol) needs to be employed for the transmission, so that HARQ related control information (such as NDI, HARQ process ID, etc.) may not need to be signaled for the transmission.

In another embodiment of the invention, the component carrier (de)activation message may be used to trigger/activate periodic channel quality feedback (periodic CQI/PMI/RI transmission) with respect to the sub-frame where the component carrier (de)activation message for the action of the downlink component carrier is received.

In this embodiment of the invention, procedure as known from 3GPP LTE (Release 8/9) is reused. Accordingly periodic CQI/PMI/RI is basically transmitted in sub-frames having a sub-frame number satisfying the condition:

$$(N_{Subframe} - N_{OFFSET,CQI}) \bmod N_{Periodicity} = 0 \quad (2)$$

where $$N_{Subframe} = 10 \times n_f + \lfloor n_s/2 \rfloor \quad (3)$$

and where $n_f$ is the system frame number, and $n_s = \{0, 1, \ldots, 19\}$ is the slot index within the frame. It should be noted that the relation here is a simplified mechanism to explain the timing principle, however there are special cases that render the timing slightly more complicated (see also 3GPP TS 36.213, "Physical layer procedures", version 8.8.0 (Release 8) or 9.0.1 (Release 9), section 7.2.2 for further details, the documents being available at http://www.3gpp.org and the sections being incorporated herein by reference).

Figure 22:
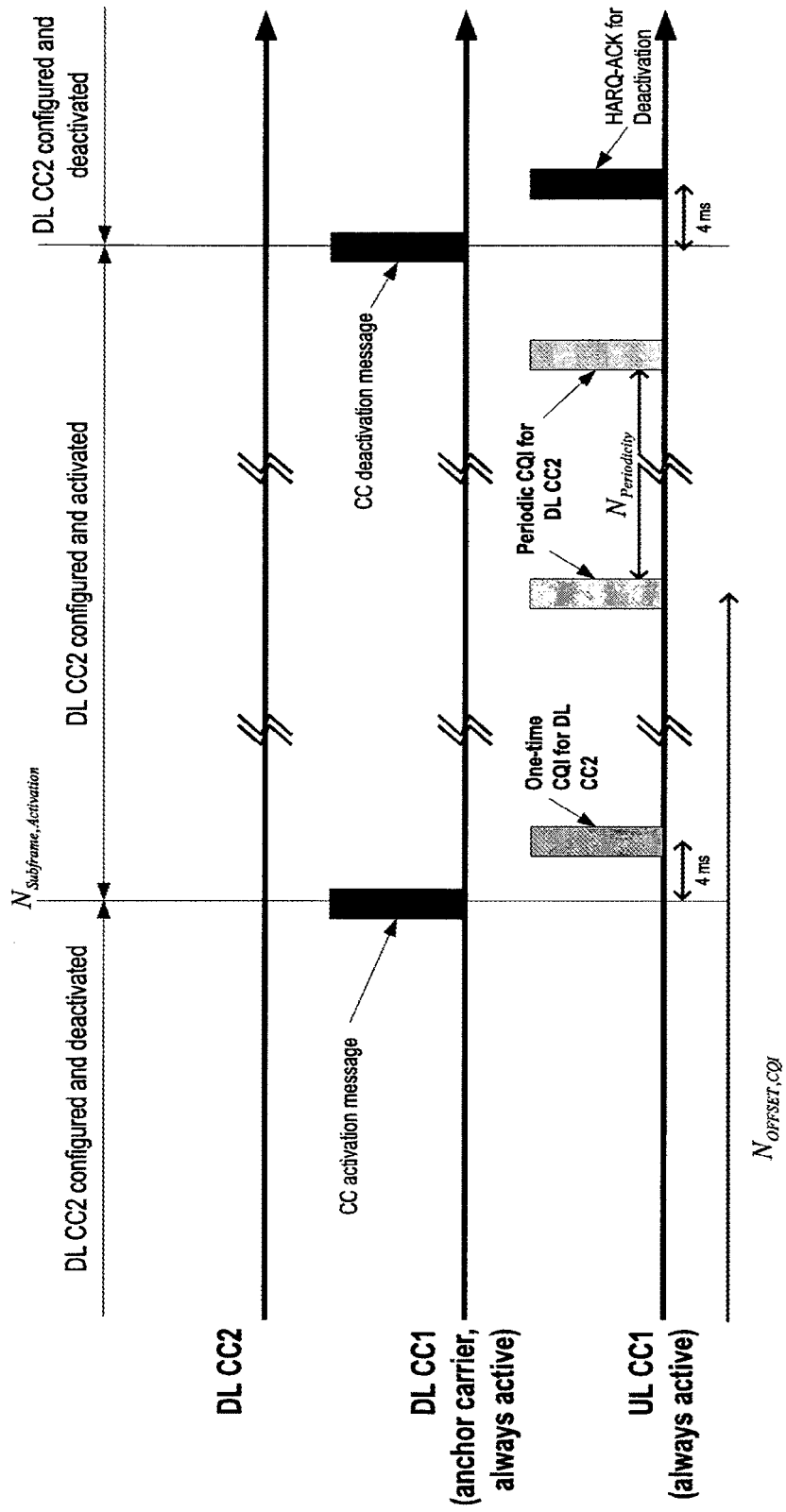

In one embodiment of the invention, in case the component carrier (de)activation message from the base station comprises a CQI flag being set, the mobile terminal is providing a single (aperiodic) CQI report (One-time CQI) at a given offset of k sub-frames relative to the sub-frame of the (de)activation message and starts signaling periodic CQI reports in the sub-frames and on the PUCCH resources that have been configured for the component carrier activated by the component carrier (de)activation message. An exemplary scenario according to this embodiment of the invention for visualizing this procedure is shown in FIG. 22, where after the activation of downlink (DL) component carrier (CC) 2 (DL CC2) by means of the CC activation message, a CQI report (One-time CQI for DL CC2) is sent after k=4 sub-frames after having received the CC activation message for DL CC2 in which a CQI request flag is included and set, while the subsequent CQI reports for DL CC2 are signaled in the sub-frame number indicated by the parameter $N_{OFFSET,CQI}$ on the uplink resources and with the periodicity $N_{Periodically}$ configured for periodic CQI reporting. Furthermore, upon the base station signaling a CC deactivation message for DL CC2 in which a CQI request flag included and not set, the mobile terminal deactivates DL CC2 again and stops periodic CQI reporting.

In another embodiment of the invention, a new way of calculating $N_{OFFSET,CQI}$ is employed so that the first periodic CQI report of the mobile terminal is transmitted at a given offset k relative to the component carrier activation message. In the periodic CQI reporting procedure of 3GPP LTE (Release 8/9) indicated above, the transmission of the CQI/PMI/RI thus depends on the system-wide sub-frame number, irrespective of the sub-frame number of the sub-frame comprising the component carrier (de)activation message. In order to start the periodic CQI/PMI/RI report as early as possible, in this embodiment the condition is modified as follows. Periodic CQI/PMI/RI is transmitted in a sub-frame the sub-frame number of which is satisfying the (updated) conditions (2) and (3) above as known from 3GPP TS 36.213, however changing the definition of the offset $N_{OFFSET,CQI}$ so that it doesn't refer to sub-frame number 0, but to the sub-frame number in which the component carrier (de)activation message has been received, i.e.

$$N_{OFFSET,CQI} = \mathrm{mod}(N_{Subframe,Activation}+k, N_{Subframe,Max}+1) \quad (4)$$

where $N_{Subframe,Activation}$ is the sub-frame number of the sub-frame in which the component carrier (de)activation message triggering (activating) CQI/PMI/RI reporting for the activated downlink component carrier, and $N_{Subframe,Max}$ is largest sub-frame index. In 3GPP LTE (Release 8/9), the system frame number ranges from 0 to 1023, each system frame comprises slot 0 to 19; consequently $N_{Subframe,Max}=10\times n_{f,Max}+\lfloor n_{s,Max}/2 \rfloor$ or $N_{Subframe,Max}=10239$. In the condition (4), the offset k added to $N_{Subframe,Activation}$ may be for example configurable or static.

In one example, k=4 so as to ensure that the earliest channel quality feedback transmission occurs 4 sub-frames after the sub-frame number of the sub-frame in which the component carrier (de)activation message triggering (activating) CQI/PMI/RI reporting for the activated downlink component carrier(s). However, if the channel quality feedback is to be provided with a larger offset (i.e. later), it can be necessary to increase the parameter k, as mentioned before. For example, k∈{4, 6, 8, 10, 12}.

Figure 23:
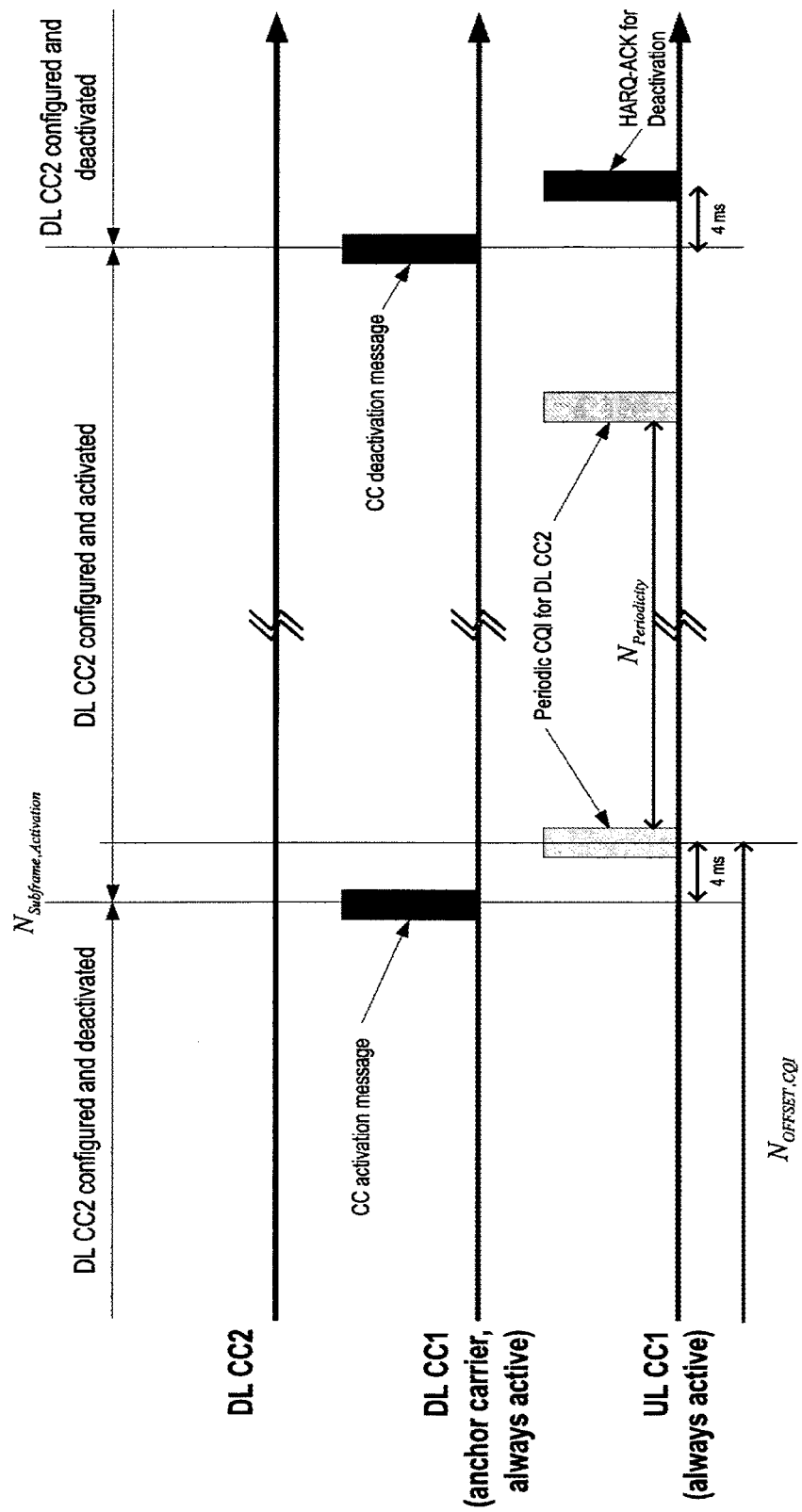

FIG. 23 is exemplarily highlighting the mobile terminal's behavior according to this embodiment of the invention in response to the reception of a component carrier (de)activation message comprising a CQI request flag being set using the updated periodic CQI reporting procedure. Upon the base station activating DL CC2 by means of the CC activation message received in sub-frame number $N_{Subframe,Activation}$, the offset $N_{OFFSET,CQI}$ is assumed to be set according to condition (4) and sends the CQI report for DL CC2 k sub-frames later, which is here 4 sub-frames, respectively 4 ms, after having received the CC activation message on the PUCCH resources configured for periodic CQI reporting. Subsequently, the mobile terminal provides periodic CQI reports for DL CC2 with periodicity $N_{Periodicity}$ configured for periodic CQI reporting, until the CC deactivation message of the base station deactivates DL CC2.

The benefit of the modified periodic CQI/PMI/RI reporting procedure discussed in the previous paragraphs is that the first CQI/PMI/RI report is received very early after having activated the downlink component carrier, which may be helpful for the scheduler of the base station to schedule transmission on the activated downlink component carrier, and that subsequent CQI reports are transmitted according to the configured periodicity.

Since depending on the configuration of the periodic CQI/PMI/RI report it can happen that it is unclear what kind of transmission rank (the transmission rank determines the precoder matrix dimension for MIMO transmissions) is used, preferably the first such periodic CQI/PMI report consists of a wideband CQI/PMI report assuming Rank=1. Alternatively, the first CQI/PMI/RI report after activation of the downlink component carrier(s) consists of a Rank indicator (RI), followed by the CQI/PMI in the next report transmitted according to the periodic CQI/PMI/RI configuration as discussed in the preceding paragraphs.

The cases where the periodic CQI/PMI/RI report is configured as at least wideband CQI/PMI and sub-band CQI as per 3GPP TS 36.213, section 7.2.2 can be treated applying the above mentioned timing offset and first CQI/PMI/RI report content principles mutatis mutandis. Particularly, it should be avoided to send a subband CQI as the first CQI report after activation.

In addition to the CQI request flag or alternatively thereto, the unused bits (extended use) of the component carrier (de)activation message may also be used to trigger the transmission of sounding reference symbols (SRS) in the uplink or a power headroom report (PHR).

Figure 19:
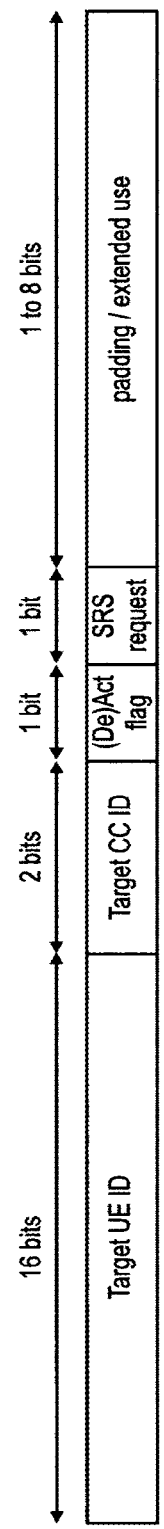

In a further embodiment of the invention a "SRS request" flag may be included in the component carrier (de)activation message as shown in FIG. 19. The SRS request flag when set by the base station, requests the mobile terminal to start transmission of sounding reference symbols (SRS) on the linked uplink component carrier(s) that is/are linked to the downlink component carrier(s) activated by the component carrier (de)activation message. If the component carrier (de)activation message is activating uplink component carrier(s), the mobile terminal starts sending sounding reference symbols (SRS) on the activated uplink component carrier(s). Triggering SRS instead of CQI may be particularly beneficial in case of time division duplex (TDD) systems where the channel can be assumed to be reciprocal, so that the channel estimation for the uplink based on SRS can be used for the channel estimation for the downlink as well.

Similar to the inclusion of a CQI request flag, the inclusion of the SRS request flag is advantageously included in component carrier (de)activation messages that indicate a component carrier activation. In case of deactivation, the bits for the either flag can be reserved for other signaling. Alternatively, SRS request flag (or an SRS field having more than one bit) may also be present in component carrier (de)activation messages that deactivated a component carrier, and may be used to point to a new component carrier where the mobile terminal should subsequently expect or transmit signals that so far have been transmitted on the component carrier that is being deactivated.

In a further alternative implementation the bits for the SRS request flag and the CQI request flag within a component carrier (de)activation message could be used to indicate a time offset between the reception of the (de)activation command and the execution of the (de)activation command. Alternative uses of extra bits are to signal whether the reception of the command should be acknowledged by the receiver (explained below).

The signalling of SRS enabling/disabling as described above can also be realized in accordance with the second and third aspect of the invention: Using MAC signaling. SRS information that indicates for which component carriers(s) in the uplink SRS(s) should be transmitted by the user equipment. For example, the SRS information that indicate the (de)activation of the SRS(s) may be for example provided in a new MAC control element, similar as described for the component carrier (de)activation message. This MAC control element contains a bitmap similar to the MAC control element for the downlink component carrier (de) activation as described above. Each bit in the bitmap refers to one uplink component carrier of the user equipment for which the SRS transmission should be started/stopped. Alternatively, one can consider the bits of the bitmap associated to respective ones of the configured downlink component carriers. In this case the bit for a given downlink component carrier indicating the (de)activation of SRS will cause the user equipment to (de)activate the transmission of SRS on the uplink component carrier linked to the given downlink component carrier. For example, a bit of the bitmap being set to 0 may indicates not to transmit periodic SRS on the associated (linked) uplink component carrier, respectively to stop transmitting periodic SRS; while a bit set to 1 would indicate to activate periodic SRS transmission on the associated (linked) uplink component carrier (or vice versa).

If there are enough bits unused in the MAC control element for downlink component carrier (de)activation these bits can be used for the SRS (de)activation as described above. In the example given above, assuming that there are five downlink component carriers aggregated in th downlink, of which four downlink component carriers can be activated or deactivated (i.e. one PCC and four SCCs are provided), four bits are needed for the (de)activation of the downlink secondary component carriers. Considering the MAC control element to have the size of one octet, this leaves additional four bits that are not used which can be used for the bitmap to signal SRS (de)activation as described above.

Figure 24:
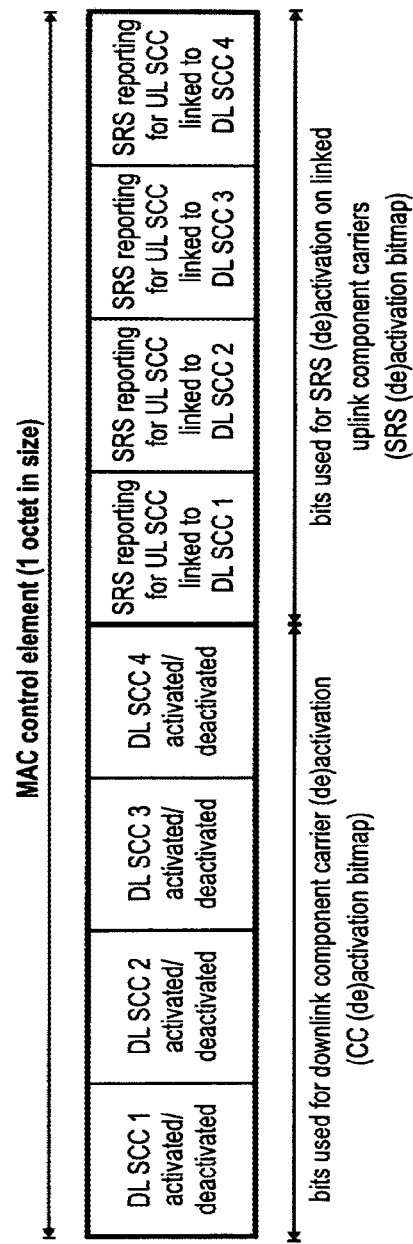
FIG. 24 shows a MAC control element according to an exemplary embodiment of the invention for simultaneously (de)activating one or more downlink component carriers and (de)activating SRS transmissions on one or more (linked) uplink component carriers of the user equipment.

An exemplary MAC control element which allows simultaneous (de)activation of downlink component carriers and de)activation of SRS transmissions by the user equipment is shown in FIG. 24. The first four bits of the octet define the bitmap for downlink component carrier (de)activation, while the second four bits thereof define the bitmap for the (de)activation of SRS transmission by the user equipment.

Figure 26:
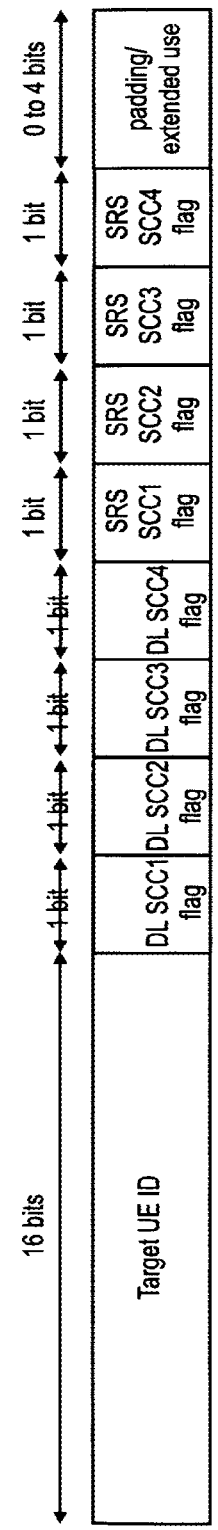

An advantage of combining both bitmaps for (de)activation of SCCs and (de)activation of SRS transmission within one MAC control element may be that periodic SRS transmission on the linked uplink component carrier(s) can start simultaneous with downlink SCC activation. This avoids possible delays that could occur when both functions are signalled in separate MAC control elements and reduces overhead. It should be noticed that both component carrier (de)activation and SRS enabling/disabling can be still signalled independently even when they are signalled in the same MAC control element. FIG. 26 shows another exemplary implementation of a component carrier (de)activation message in form of a new DCI format that allows simultaneous (de)activation of downlink component carriers and de)activation of SRS transmissions by the user equipment. Basically, the bitmask as shown in FIG. 24 is signaled in this component carrier (de)activation message together with an indication of the user equipment which is to receive the component carrier (de)activation message.

In another embodiment of the invention in case a downlink component carrier is activated by the base station, the activation of the downlink component carrier triggers a power headroom report (PHR) by the mobile terminal. The mobile terminal may send the triggered PHR report on the resources assigned by a next uplink grant for this linked uplink component carrier to the base station. This may ensure that the base station is informed on the path-loss situation for the linked uplink component carrier in the next uplink transmission of the mobile terminal on the linked uplink component carrier. This may be beneficial since the linked uplink component carrier has most likely not been used at least for a longer time period prior to the activation of the linked downlink component carrier. The power headroom reports from the mobile terminal enable the base station to improve scheduling decisions.

Alternatively, in another embodiment of the invention, the detailed CQI reporting, SRS transmission, PHR reporting etc. in response to a component carrier (de)activation may also be configured by the base station using RRC signaling or may use a pre-determined configuration (known to base station and mobile terminal).

Upon successful detection of a (de)activation command, the mobile station may confirm the execution of the (de) activation command by sending a confirmation message (acknowledgement) in uplink. In one embodiment of the invention, the following method is used to acknowledge the successful decoding of the component carrier (de)activation message, respectively the execution of the (de)activation command:

Sending an acknowledgement (also referred to as "HARQ-ACK" in the 3GPP terminology) in case of deactivation of a component carrier, where the resource for the acknowledgement transmission follows the principles of 3GPP LTE (Release 8/9) for sending HARQ-ACK in case of a downlink data transmission (PDSCH) as defined in 3GPP TS 36.213, section 10. In brief, the PUCCH resource for the HARQ-ACK is determined according to the PDCCH resource where the (de)activation message is transmitted. In this case, the eNodeB can do a power detection to check whether HARQ-ACK was transmitted on the expected resource or not.

Sending an acknowledgement (also referred to as "HARQ-ACK" in the 3GPP terminology) in case of activation of a component carrier without requesting a quick CQI, where the resource for the acknowledgement transmission follows the procedure of 3GPP LTE (Release 8/9) for sending HARQ-ACK in case of a downlink data transmission as defined in 3GPP TS 36.213, section 10. In this case, the eNB can do a power detection to check whether HARQ-ACK was transmitted on the expected resource or not.

Sending the CQI report in case of activation of a component carrier and CQI request flag being set in the component carrier (de)activation message. In this case, the eNodeB can do a power detection to check whether CQI report was transmitted on the expected resource or not.

Triggering a PHR in case of activation of a component carrier.

As indicated above, PUCCH feedback resources for the acknowledgement may be for example determined by the mobile terminal in the same fashion as provided I the 3GPP LTE (Release 8/9) procedure, as if the component carrier (de)activation message schedules a PDSCH transmission, e.g. by DCI format 1A (which is may have the same size as the component carrier (de)activation message). Furthermore, as eNodeB is aware of whether the user equipment will send an acknowledgement (HARQ-ACK) or a CQI report, the eNodeB can monitor the respective uplink resources on which the acknowledgement or CQI report is expected from the user equipment.

Optionally, the user equipment may also send a NACK (HARQ NACK) in case of not having decoded the component carrier (de)activation message procedure of 3GPP LTE (Release 8/9) for sending HARQ-NACK in case of a downlink data transmission as defined in 3GPP TS 36.213, section 10.

Figure 20:
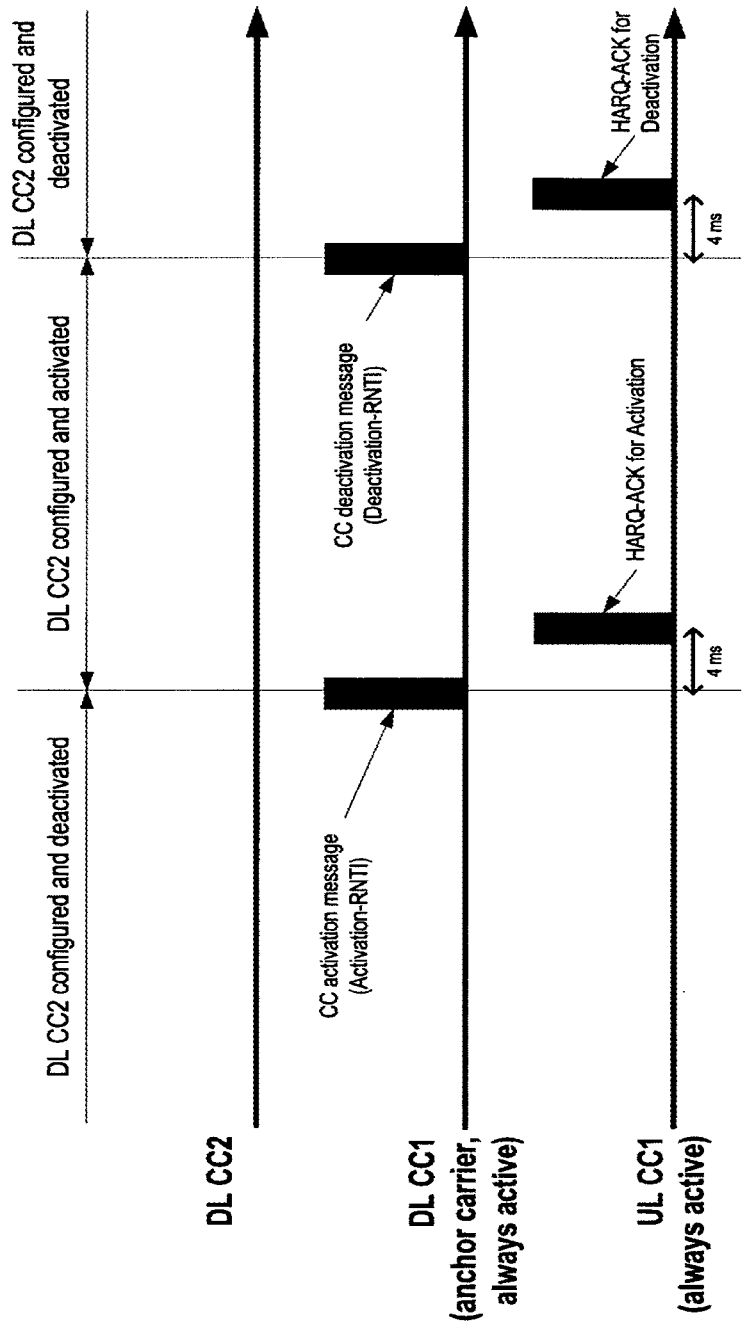
FIGS. 20 to 23 show different exemplary scenarios related to acknowledging the component carrier (de)activation message and the triggering of CQI reporting from the mobile terminal in accordance with different embodiments of the invention.

FIG. 20 shows an exemplary scenario according to an exemplary embodiment of the invention, where an Activation and a Deactivation RNTI are configured for the activation, respectively deactivation of component carriers. In this example, upon activation of one of the component carriers by the CC activation message (Activation RNTI), the user equipment synchronously signals an HARQ-ACK to the eNodeB to acknowledge the successful decoding of the CC activation message. The HARQ-ACK is sent with a given offset to the CC activation message (i.e. PDCCH containing same), for example after 4 ms. Similarly, upon the base station deactivating the component carrier again by means of the CC deactivation message (Deactivation RNTI), the user equipment again acknowledges the deactivation by means of a HARQ-ACK that is again synchronously sent in the uplink after 4 ms.

Figure 21:
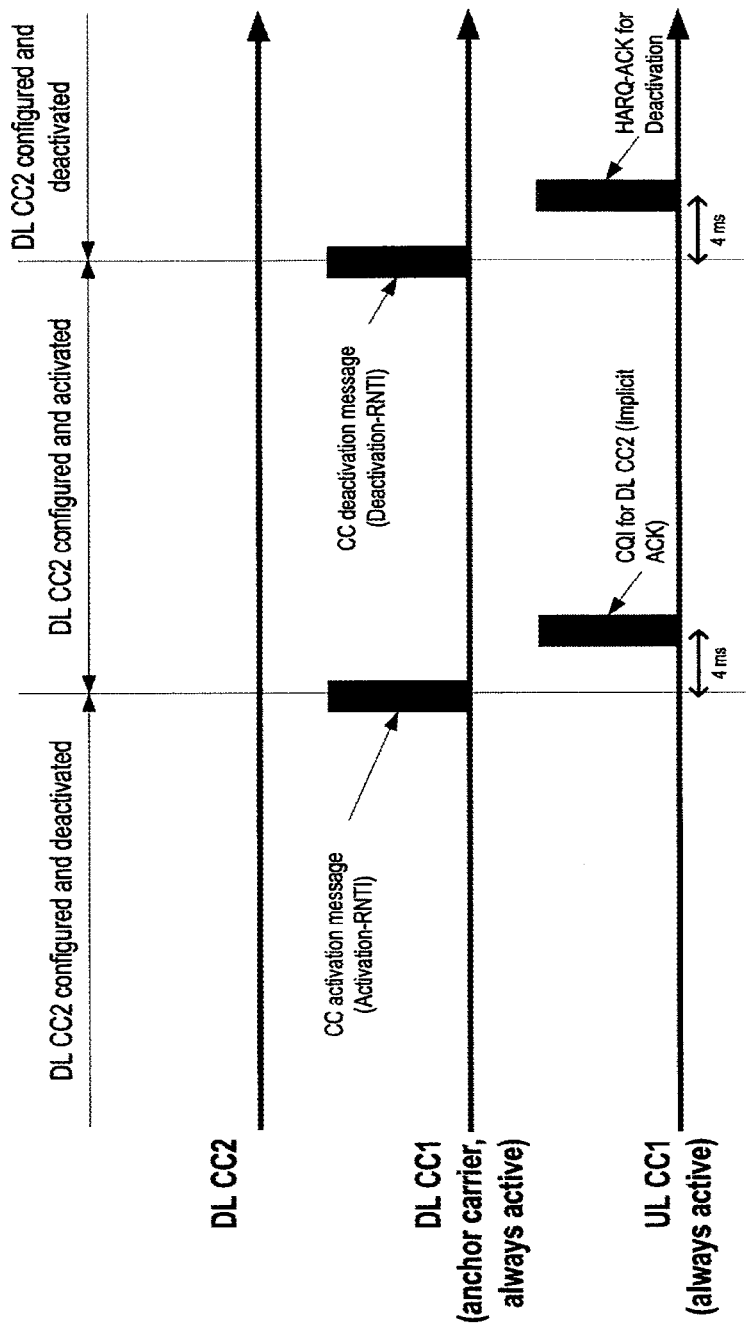

FIG. 21 shows another exemplary scenario according to a further exemplary embodiment of the invention, where an Activation and a Deactivation RNTI are configured for the activation, respectively deactivation of component carriers. Furthermore, the activation of one of the component carriers by the CC activation message (Activation RNTI) is further requesting the user equipment to signal channel quality feedback for the activated downlink component carrier (CQI request flag being set in the CC activation message). Accordingly, the user equipment signals at a known timing relative to the CC activation message, here 4 ms after receiving same, an CWI report to the eNodeB thereby acknowledging the successful decoding of the CC activation message. Upon the base station deactivating the component carrier again by means of the CC deactivation message (Deactivation RNTI), the user equipment again acknowledges the deactivation by means of a HARQ-ACK that is synchronously sent in the uplink after 4 ms.

In case the eNodeB intents to increase uplink and downlink capacity at the same time, in a further embodiment of the invention, the base station may further activate a downlink component carrier that is linked to an uplink component carrier that is currently not used for uplink transmissions. There is no information as to channel quality for an inactive or configured but deactivated uplink component carrier available at the eNodeB. Consequently in this embodiment of the invention, the activation of a downlink component carrier is further triggering sounding reference signal (SRS) transmission on the uplink component carrier(s) linked to the activated downlink component carriers(s). In this case no additional SRS request flag may be needed, but the start of signaling SRS on the uplink component carrier linked to a downlink component carrier activated by component carrier (de)activation message may be a default behavior of the mobile terminal in response to the activation of the downlink component carrier.

Similarly as for the CQI reporting, also the transmission of SRS is not in all cases beneficial/required. Therefore it should be possible that eNodeB enables/disables SRS transmission when activating downlink component(s). This could be achieved by including a flag in the (de)activation message which indicates whether user equipment is required to send SRS. It may be further configured or specified or signaled whether such an SRS should be one-time only, or periodic. In either case, further "extra" bits can be used to define one or more of the SRS parameters such as bandwidth, comb, etc (refer to 3GPP LTE (Release 8/9) SRS parameters).

Of course, the component carrier (de)activation message may also be designed to allow the simultaneous transmission of a CQI request flag, triggering a PHR and/or a SRS request flag.

When user equipment monitors the PDCCH, there is always a certain probability (false alarm rate) that the mobile terminal falsely detects a PDCCH: the CRC check of the PDCCH may be correct even though the PDCCH was not intended for this user equipment, i.e. CRC passes even though there is a RNTI mismatch (unintended user). This so called false alarm might happen, if the two effects of transmission errors caused by the radio channel and RNTI mismatch cancel each other. The probability of a falsely positive decoded PDCCH depends on the CRC length. The longer the CRC length, the lower the probability that a CRC-protected message is falsely correct decoded. With the CRC size of 16 bit the false alarm probability would be $1.5 \cdot 10^{-5}$.

In case a user equipment falsely detects a PDCCH with a downlink component carrier (de)activation message indicating the deactivation of certain downlink component carrier(s) the user equipment would stop monitoring PDCCH/PDSCH for those indicated downlink component carrier(s) and also stops reporting CQI measurements. Given the severe consequences of such user equipment behavior, it is therefore desirable to decrease the false alarm probability.

Each bit of virtual CRC can be assumed to halve the false alarm risk. On the other hand, each additional RNTI that is used increases the false alarm risk linearly. For example, in case of employing four component carrier-specific activation-RNTIs and four component carrier-specific deactivation-RNTIs, the false alarm risk is eight times higher than for the case of a single CC-RNTI. On the other hand, using the altogether eight CC-RNTIs does not require the inclusion of a target CC ID field in the DCI payload nor that of an Activation/Deactivation field. In most of the exemplary implementations that have been discussed above, the largest target component carrier ID size is four bits. Consequently, the usage of eight component carrier-RNTIs without target component carrier ID field results in a false alarm risk of $$\frac{8}{2^4} = 0.5$$

times compared to the risk when a single CC-RNTI with a four-bit target component carrier ID field is employed. The drawback is the increased cost of RNTI, and the restriction that multiple (de)activation messages are required to (de)activate multiple component carriers at the same time.

In one embodiment of the invention, it is therefore proposed that the downlink component carrier (de)activation message comprises one or more extra bits (in a CRC field) can be used as a virtual CRC to reduce the false alarm risk. These additional bit(s) are set to a known, predefined value which is to be verified by the mobile terminal.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A communication apparatus comprising:
a receiver which, in operation, receives a MAC control element including bits which indicate an activation/deactivation status of each of at least one secondary component carrier added to a primary component carrier, which is always activated, each of the at least one secondary component carrier corresponding to one of the bits that indicates whether the secondary component carrier should be activated or deactivated, wherein the MAC control element includes trigger bits which indicate activation/deactivation of sounding reference signal (SRS) transmission, and when any one of the bits indicates that its corresponding secondary component carrier should be activated, the SRS transmission on the corresponding secondary component carrier is triggered according to the trigger bits;
control circuitry which, in operation, activates or deactivates each of the at least one secondary component carrier according to the received MAC control element; and
a transmitter which, in operation, starts an SRS transmission on the activated secondary component carrier(s).

2. The communication apparatus according to claim 1, wherein the bits form a single octet.

3. The communication apparatus according to claim 1, wherein the bits include at least one unused bit.

4. The communication apparatus according to claim 1, wherein the SRS transmission is periodic.

5. The communication apparatus according to claim 1, wherein when the activated secondary component carrier is deactivated, the transmitter stops the SRS transmission on the deactivated secondary component carrier.

6. The communication apparatus according to claim 1, wherein the primary component carrier and each of the at least one secondary component carrier are each a component carrier including a plurality of subcarriers.

7. A communication method comprising:
reception circuitry of a terminal apparatus receiving a MAC control element including bits which indicate an activation/deactivation status of each of at least one secondary component carrier added to a primary component carrier, which is always activated, each of the at least one secondary component carrier corresponding to one of the bits that indicates whether the secondary component carrier should be activated or deactivated, wherein the MAC control element includes trigger bits which indicate activation/deactivation of sounding reference signal (SRS) transmission, and when any one of the bits indicates that its corresponding secondary component carrier should be activated, the SRS transmission on the corresponding secondary component carrier is triggered according to the trigger bits;
processing circuitry of the terminal apparatus activating or deactivating each of the at least one secondary component carrier according to the received MAC control element; and
transmission circuitry of the terminal apparatus starting an SRS transmission on the activated secondary component carrier(s).

8. The communication method according to claim 7, wherein the bits form a single octet.

9. The communication method according to claim 7, wherein the bits include at least one unused bit.

10. The communication method according to claim 7, wherein the SRS transmission is periodic.

11. The communication method according to claim 7, further comprising:
in response to deactivation of the activated secondary component carrier, stopping the SRS transmission on the deactivated secondary component carrier.

12. The communication method according to claim 7, wherein the primary component carrier and each of the at least one secondary component carrier are each a component carrier including a plurality of subcarriers.

13. A non-transitory computer-readable medium having contents which configure signal processing circuitry to perform a communication method, the communication method comprising:
receiving a MAC control element including bits which indicate an activation/deactivation status of each of at least one secondary component carrier added to a primary component carrier, which is always activated, each of the at least one secondary component carrier corresponding to one of the bits that indicates whether the secondary component carrier should be activated or deactivated, wherein the MAC control element includes trigger bits which indicate activation/deactivation of sounding reference signal (SRS' transmission, and when any one of the bits indicates that its corresponding secondary component carrier should be activated, the SRS transmission on the corresponding secondary component carrier is triggered according to the trigger bits;

activating or deactivating each of the at least one secondary component carrier according to the received MAC control element; and starting an SRS transmission on the activated secondary component carrier(s).

14. The non-transitory computer-readable medium according to claim 13, wherein the bits form a single octet.

15. The non-transitory computer-readable medium according to claim 13, wherein the bits include at least one unused bit.

16. The non-transitory computer-readable medium according to claim 13, wherein the SRS transmission is periodic.

17. The non-transitory computer-readable medium according to claim 13, wherein the communication method further comprises:

in response to deactivation of the activated secondary component carrier, stopping the SRS transmission on the deactivated secondary component carrier.

18. The non-transitory computer-readable medium according to claim 13, wherein the primary component carrier and each of the at least one secondary component carrier are each a component carrier including a plurality of subcarriers.

* * * * *

UNITED STATES PATENT AND TRADEMARK OFFICE
CERTIFICATE OF CORRECTION

PATENT NO. : 10,250,372 B2
APPLICATION NO. : 15/276465
DATED : April 2, 2019
INVENTOR(S) : Martin Feuersaenger et al.

It is certified that error appears in the above-identified patent and that said Letters Patent is hereby corrected as shown below:

In the Claims

Column 43, Line 5 Claim 13:
"deactivation of sounding reference signal (SRS' transmission" should read, --deactivation of sounding reference signal (SRS) transmission--.

Signed and Sealed this
Twenty-first Day of May, 2019

Andrei Iancu
*Director of the United States Patent and Trademark Office*